US007339919B2

(12) United States Patent
Harada

(10) Patent No.: US 7,339,919 B2
(45) Date of Patent: Mar. 4, 2008

(54) COMMUNICATING SYSTEM, COMMUNICATING METHOD, AND BASE STATION

(75) Inventor: Hiroshi Harada, Kanagawa (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 449 days.

(21) Appl. No.: 11/074,546

(22) Filed: Mar. 7, 2005

(65) Prior Publication Data

US 2005/0207370 A1    Sep. 22, 2005

(30) Foreign Application Priority Data

Mar. 8, 2004    (JP) .............................. 2004-064155

(51) Int. Cl.
*H04B 7/212* (2006.01)
*H04L 12/413* (2006.01)

(52) U.S. Cl. ....................................... 370/347; 370/447
(58) Field of Classification Search ................ 370/336, 370/347, 447
See application file for complete search history.

(56) References Cited

U.S. PATENT DOCUMENTS 5,420,864 A    5/1995   Dahlin et al.
6,469,996 B1   10/2002  Dupuy
6,724,813 B1 * 4/2004  Jamal et al. ................. 375/219
2002/0089957 A1  7/2002  Viero

FOREIGN PATENT DOCUMENTS

| JP | 2003-32171  | 1/2003 |
| JP | 2003-234688 | 8/2003 |

OTHER PUBLICATIONS

Harada et al., New Generation Mobile Communication System by Dynamic Parameter Controlled OF/TDMA, IEICE Technical Report, vol. 103, No. 553, 9 pages including pp. 41-46, Jan. 9, 2004.

* cited by examiner

*Primary Examiner*—Joseph Feild
*Assistant Examiner*—Michael Faragalla
(74) *Attorney, Agent, or Firm*—Bell, Boyd & Lloyd LLP

(57) ABSTRACT

A communication system, a communicating method and a base station are provided. When a base station generates an FCM, the base station detects the use rate of a transmission buffer and decides how slots of a frame of an uplink channel are structured. When the use rate of the transmission buffer is high, the base station designates the number of ACTSs to 0 so that the base station does not accept registration requests and so forth from mobile stations. When the use rate of the transmission buffer is low, the base station designates the number of ACTSs to 1. When the number of mobile stations is large as in a large convention hall, the base station generates TDMA frames each of which has only ACTSs. The base station can decide the number of ATCSs corresponding to the probability of which registration requests and so forth from mobile stations collide.

3 Claims, 31 Drawing Sheets

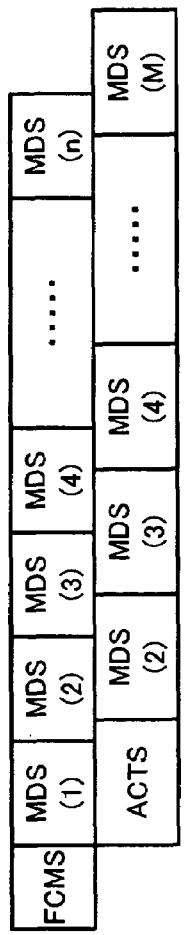
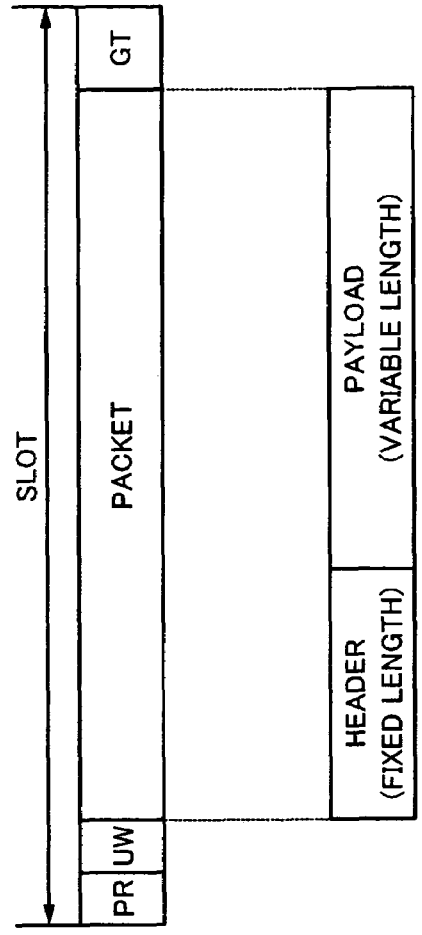
*Fig. 4A*
*Fig. 4B*
*Fig. 4C*

Fig. 13A

| No. | CONNECTION SETUP MAC ADDRESS | CONNECTION PRIORITY | DOWNLINK TRANSMISSION BUFFER STATUS | DOWNLINK FLAG | UPLINK TRANSMISSION BUFFER STATUS | UPLINK FLAG |
|---|---|---|---|---|---|---|
| 1 | A | 1 | 0 | OFF | 1 | OFF |
| 2 | B | 1 | 2 | OFF | 3 | OFF |
| 3 | C | 2 | 3 | OFF | 2 | OFF |
| 4 | D | 1 | 2 | OFF | 0 | OFF |

Fig. 13B

| FCMS | B | C | C | D | C | B | C | D | (NONE) |
|---|---|---|---|---|---|---|---|---|---|

Fig. 16

| ACTS | A | B | C | C | D | B | B |

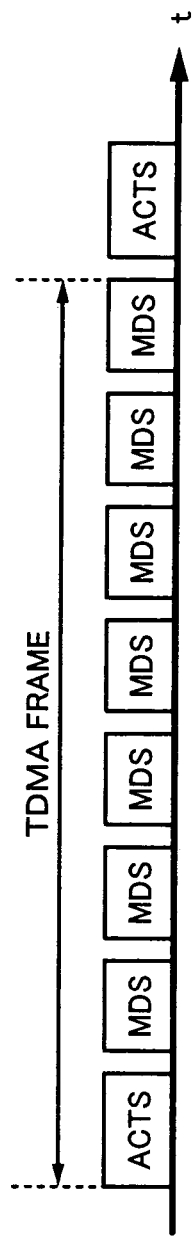
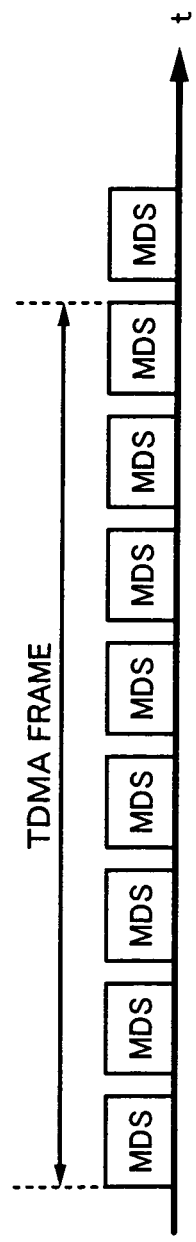
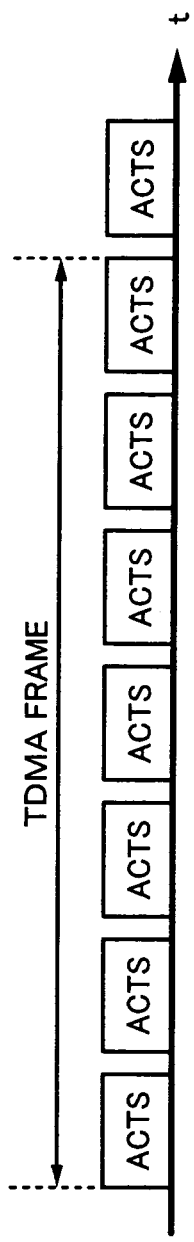
Fig. 20A
Fig. 20B
Fig. 20C

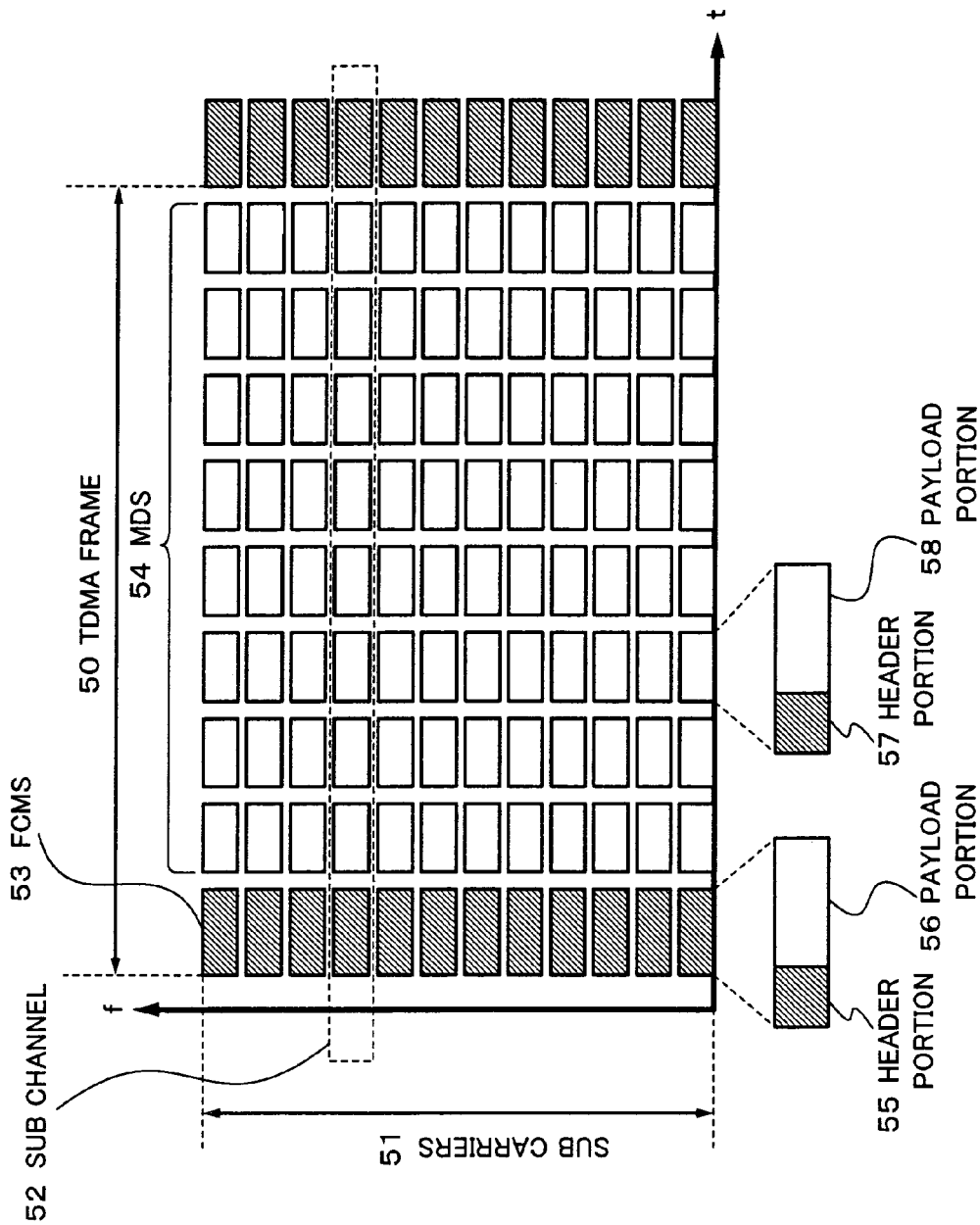

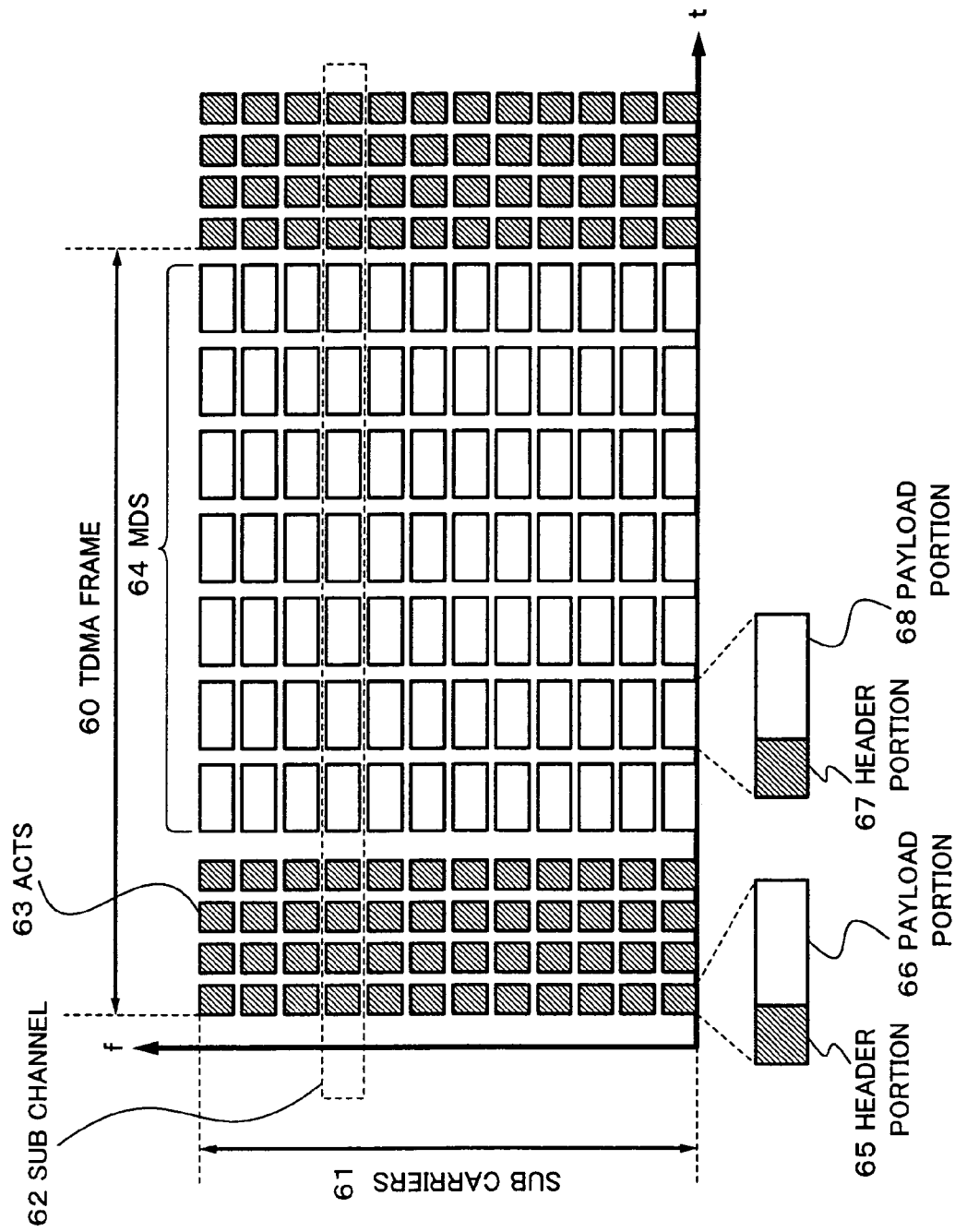

*Fig. 26A*

| COMMON CHARACTERISTICS | |
|---|---|
| TRANSMISSION TIME OF 1 OFDM SYMBOL ($\mu$S) | 8 |
| GUARD INTERVAL LENGTH ($\mu$S) | 2 |
| TOTAL TRANSMISSION TIME OF 1 OFDM SYMBOL ($\mu$S) | 10 |
| FFT SIZE (IN POINTS) | 1024 |
| GUARD INTERVAL (IN POINTS) | 256 |
| SAMPLING CLOCK (Msps) | 128 |
| NUMBER OF TRANSMISSION CARRIERS | 764 |
| NUMBER OF CARRIERS OF SUB CHANNEL | 64 |
| NUMBER OF SUB CHANNELS | 12 |
| DOWNLINK TRANSMISSION TIME ($\mu$S) | 2250+250 (FRAME GUARD) |
| UPLINK TRANSMISSION TIME ($\mu$S) | 2250+250 (FRAME GUARD) |

*Fig. 26B*

| FCMS | |
|---|---|
| FCMS HEADER PORTION (IN BYTES) | 16 |
| FMCS PAYLOAD PORTION (IN BYTES) | 64+2 (CRC) |
| MODULATING SYSTEM | BPSK |
| FEC | CONVOLUTIONAL CODE (ENCODING RATE 1/2 + VITERBI DECODING) |
| NUMBER OF OFDM DATA SYMBOLS | 21 |
| NUMBER OF PREAMBLE OFDM SYMBOLS | 3 (CHANNEL ESTIMATION 2) |
| FCMS TRANSMISSION TIME ($\mu$S) | 240 |
| SLOT GUARD FOR FCMS ($\mu$S) | 10 |
| FCMS TRANSMISSION TIME | 250 |

Fig. 27A

| MDS | |
|---|---|
| MDS HEADER PORTION (IN BYTES) | 12 |
| MDS PAYLOAD PORTION (IN BYTES) | 128/256/384+2(CRC) |
| MODULATING SYSTEM | QPSK/16QAM/64QAM |
| FEC | CONVOLUTIONAL CODE (ENCODING RATE 1/2 OR 3/4+ VITERBI DECODING) |
| NUMBER OF OFDM DATA SYMBOLS | 19 |
| NUMBER OF PREAMBLE OFDM SYMBOLS | 5 (CHANNEL ESTIMATION 2) |
| MDS TRANSMISSION TIME ($\mu$S) | 240 |
| MDS SLOT GUARD ($\mu$S) | 10 |
| MDS TRANSMISSION TIME ($\mu$S) | 250 |
| NUMBER OF MDS SLOTS | 8 (UPLINK), 7 (DOWNLINK) |

Fig. 27B

| ACTS | |
|---|---|
| ACTS HEADER PORTION (IN BYTES) | 6 |
| ACST PAYLOAD PORTION (IN BYTES) | 32+2(CRC) |
| MODULATING SYSTEM | BPSK |
| FEC | CONVOLUTIONAL CODE (ENCODING RATE 1/2 + VITERBI DECODING) |
| NUMBER OF OFDM DATA SYMBOLS | 10 |
| NUMBER OF PREAMBLE OFDM SYMBOLS | 2 (CHANNEL ESTIMATION 2) |
| ACTS TRANSMISSION TIME ($\mu$S) | 120 |
| ACTS SLOT GUARD ($\mu$S) | 2.5 |
| ACTS TRANSMISSION TIME ($\mu$S) | 122.5 |
| NUMBER OF ACTS SLOTS ($\mu$S) | 4 |
| 4 ACTS TRANSMISSION TIME ($\mu$S) | 490 |
| 4 ACTS GUARD TIME ($\mu$S) | 10 |
| TOTAL ACTS TRANSMISSION TIME ($\mu$S) | 500 |

COMMUNICATING SYSTEM, COMMUNICATING METHOD, AND BASE STATION

CROSS REFERENCE TO RELATED APPLICATIONS

The present application claims priority to Japanese Patent Application No. 2004-064155 filed on Mar. 8, 2004, the disclosure of which is herein incorporated by reference.

BACKGROUND OF THE INVENTION

The present invention relates to a communicating system, a communicating method, and a base station that transmit for example multimedia data from the base station to a vehicle and data from the vehicle to the base station.

In the inter-vehicle communicating system, there are needs for multimedia communication. In the multimedia communication, mobile stations send requests for information to the base station so that it downloads multimedia data such as video data and music data to the mobile stations. The multimedia communication has a feature of which the amount of data that are transmitted (uplinked) from a mobile station to the base station are smaller than the amount of data that are transmitted (downlinked) from the base station to the mobile station. Thus, to accomplish the multimedia communication with the inter-vehicle communicating system, a radio communicating system that can effectively transmit a large amount of data that are generated as burst data to mobile stations is required. In addition, when photographed video data are transmitted from a mobile station to the base station, it cannot be always said that the amount of photographed video data is small. Thus, it is desired to effectively transmit video data.

A communicating method that is suitable for an inter-vehicle multimedia radio communication. See, Japanese Patent Laid-Open Publication No. 2003-234688. In the communicating method thereof, data are transmitted and received with time division multiple access (TDMA) frames. A TDMA frame of the downlink channel is composed of a frame control message slot (FCMS) and a message data slot (MDS), whereas a TDMA frame of the uplink channel is composed of an activation slot (ACTS) and an MDS.

A communicating system that can transmit and receive a large amount of data in a relatively short time and that can simplify a communicating process and a circuit scale of the mobile station side has been provided using the communicating method of Patent Document 1. In this communicating method, since a predetermined amount of data is returned as a response signal, data that are normally transmitted are the same as data that are re-transmitted. Thus, the capacity of a buffer on the mobile station side can be decreased. In addition, processes performed on the mobile station side can be simplified. Data that can be sent at a time are for example an IP packet that is used in the Internet. Normally, the mobile station side and the base station side basically communicate on the basis of the TCP/IP.

However, in this communicating method, since the number of slots of a TDMA frame is fixed, if the status of the radio communication changes, data cannot be transmitted and received corresponding to the changed status. Thus, effective data transmission and data reception cannot be accomplished.

For example, one TDMA frame of the uplink channel has one ACTS (four sub slots). The ACTS is used for registration—deregistration request or connection setup—connection release request that the mobile station side sends to the base station. Even if the mobile station side does not send such a request at all, since this slot is allocated, the frequency band is substantially wasted.

In contrast, when the mobile station side frequently sends registration—deregistration request and connection setup—connection release request to the base station side, if the number of ACTSs is fixed to one, slots used for registering mobile stations and setting up connections become short. As a result, these processes will largely delay. Thus, the efficiency of the communicating system will remarkably deteriorate.

SUMMARY OF THE INVENTION

The present invention provides in an embodiment a communicating system, a communicating method, and a base station that allow the number of ACTSs to be flexibly adjusted in a mobile communication using TDMA frames so as to effectively perform a setup process and so forth for mobile stations.

In an embodiment, the present invention provides a communicating system, a communicating method, and a base station that allow the number of ACTSs to be dynamically adjusted corresponding to the amount of data that the base station needs to transmit to the mobile station side.

An embodiment of the present invention is a communicating system having a base station and a mobile station that communicate with each other simultaneously using frames of an uplink channel and a downlink channel, a frame of the uplink channel being composed of a plurality of slots, the mobile station transmitting a predetermined connection request to the base station with a first type slot of a frame of the uplink channel, the base station comprising recording means for temporarily recording data to be transmitted to the mobile station through the downlink channel; and deciding means for deciding the number of first type slots contained in a frame of the uplink channel corresponding to at least one of the use rate of the recording means and the probability of which the first type slots transmitted collide between the mobile stations.

Another embodiment of the present invention is a communicating method for a base station and a mobile station that communicate with each other simultaneously using frames of an uplink channel and a downlink channel, a frame of the uplink channel being composed of a plurality of slots, the mobile station transmitting a predetermined connection request to the base station with a first type slot of a frame of the uplink channel, the base station having recording means for temporarily recording data to be transmitted to be mobile station through the downlink channel, the communicating method comprising the step of deciding the number of first type slots contained in a frame of the uplink channel corresponding to at least one of the use rate of the recording means and the probability of which the first type slots transmitted collide between the mobile stations.

A further embodiment of the present invention is a base station of a communicating system that communicates with a mobile station simultaneously using frames of an uplink channel and a downlink channel, a frame of the uplink channel being composed of a plurality of slots, the base station receiving a predetermined connection request from the mobile station with a first type slot of a frame of the uplink channel, the base station comprising recording means for temporarily recording data to be transmitted to the mobile station through the downlink channel; and deciding means for deciding the number of first type slots contained in a frame of the uplink channel corresponding to at least one of the use rate of the recording means and the probability of which the first type slots transmitted collide between the mobile stations.

According to the present invention in an embodiment, in a mobile communication using TDMA frames, since the number of ACTSs is flexibly adjusted, a setup process and so forth for the mobile station side can be more effectively performed than the conventional system. The number of ACTSs can be dynamically adjusted corresponding to the amount of data that the base station needs to transmit to the mobile station side.

Additional features and advantages of the present invention are described in, and will be apparent from, the following Detailed Description of the Invention and the figures.

BRIEF DESCRIPTION OF THE FIGURES

The invention will become more fully understood from the following detailed description, taken in conjunction with the accompanying drawings, wherein similar reference numerals denote similar portions, in which:

FIGS. 4A, 4B, and 4C are schematic diagrams showing the structures of a frame of the downlink channel and a frame of the uplink channel and the structure of data of one slot;

FIGS. 13A and 13B are schematic diagrams showing an example of a slot allocation management table and an example of slot allocation of a frame of the downlink channel, respectively;

FIG. 16 is a schematic diagram showing an example of slot allocation of a frame of the uplink channel;

FIG. 20A, FIG. 20B, and FIG. 20C are schematic diagram showing examples of the structures of TDMA frames;

FIG. 24 is a schematic diagram showing each sub channel of a TDMA frame of the downlink channel according to the present invention;

FIG. 25 a schematic diagram showing each sub channel of a TDMA frame of the uplink channel according to the present invention;

FIGS. 26A and 26B are tables showing common characteristics and characteristics of an FCMS of an example of the structure of a TDMA frame, respectively; and FIGS. 27A and 27B are tables showing characteristics of an MDS and an ACTS of an example of the structure of a TDMA frame, respectively.

DETAILED DESCRIPTION OF THE INVENTION

The present invention relates to a communicating system, a communicating method, and a base station that transmit for example multimedia data from the base station to a vehicle and data from the vehicle to the base station. With ACTSs that are flexibly adjusted, a more effective mobile communication is accomplished than the conventional method. First of all, a process (protocol) of the mobile communication using TDMA frames will be described in brief.

According to the protocol of the present invention, two channels referred to as an uplink channel and a downlink channel are used. They are communicated simultaneously. The protocol uses the frequency division duplexing (FDD) system that uses different frequencies for the downlink channel (a channel from the base station to a mobile station) and the uplink channel (a channel from a mobile station to the base station).

Figure 1:
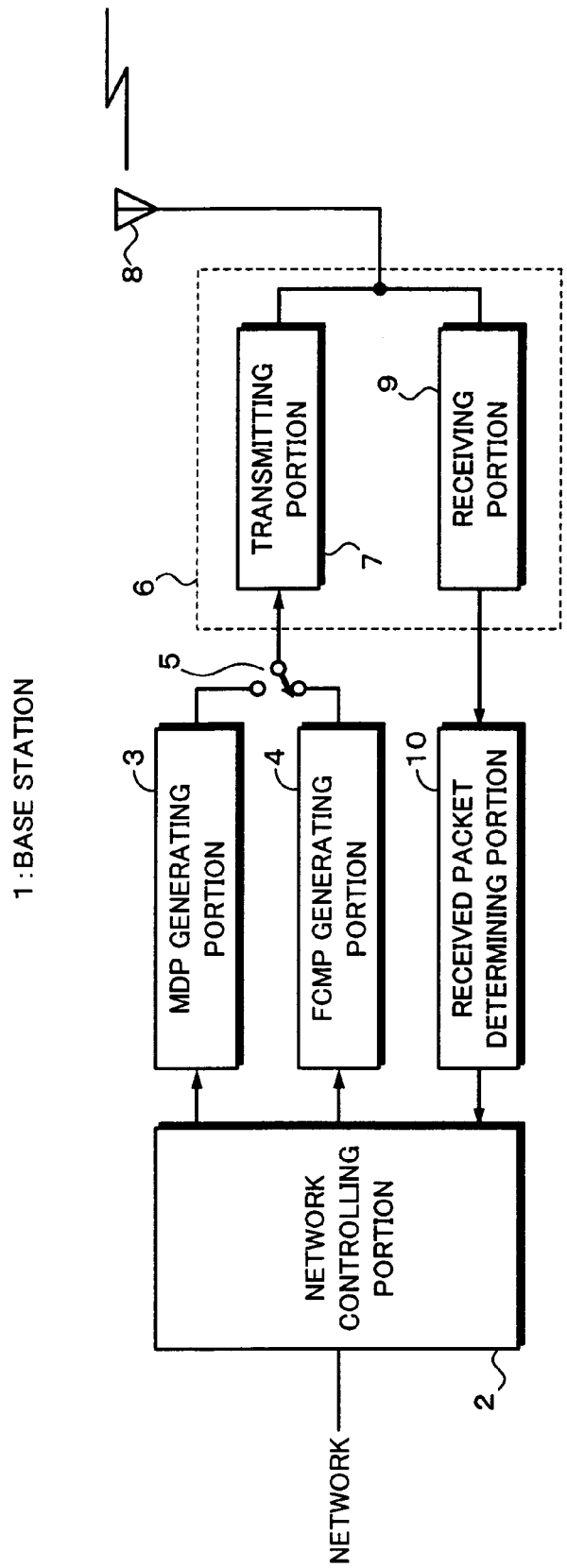
FIG. 1 is a block diagram showing an example of the structure of a base station.

In FIG. 1, a base station 1 is composed of a network controlling portion 2 connected to a network, a message data packet (MDP) generating portion 3, a frame control message packet (FCMP) generating portion 4, a selector 5 that selectively outputs the MDP and the FCMP, a transmitting portion 7 that receives an output signal of the selector 5 and that is included in a radio device 6, an antenna 8 that radiates a radio signal from the transmitting portion 7 to mobile stations, a receiving portion 9 that receives signals from mobile stations through the antenna 8, and a received packet determining portion 10. The MDP is transmitted with a message data slot (MDS) of a frame of the downlink channel. On the other hand, the FCMP is transmitted with a frame control message slot (FCMS) of a frame of the downlink channel.

Multimedia data are supplied from the network to the MDP generating portion 3 through the network controlling portion 2. The MDP generating portion 3 generates the MDP. The FCMP generating portion 4 generates the FCMP. A received packet determined by the received packet determining portion 10 is sent to the network through the network controlling portion 2. The network may be a cellular phone network, a broadcasting network, the Internet, or the like.

The base station 1 notifies mobile stations of slot allocation statuses of a frame of the downlink channel and a frame of the uplink channel with the FCMP at the beginning of each frame. Each mobile station can determine a data slot from which the mobile station can receive in accordance with the contents of the FCMP. Each mobile station can determine a data slot with which the mobile station can transmit data in accordance with the contents of the FCMP that represents the allocated status of data slots of the frame of the uplink channel. In addition, the FCMP contains information of the reception status of the base station against the frame of the uplink channel. In other words, the FCMP contains information that represents whether or not upload packets have been normally received by the base station.

Figure 2:
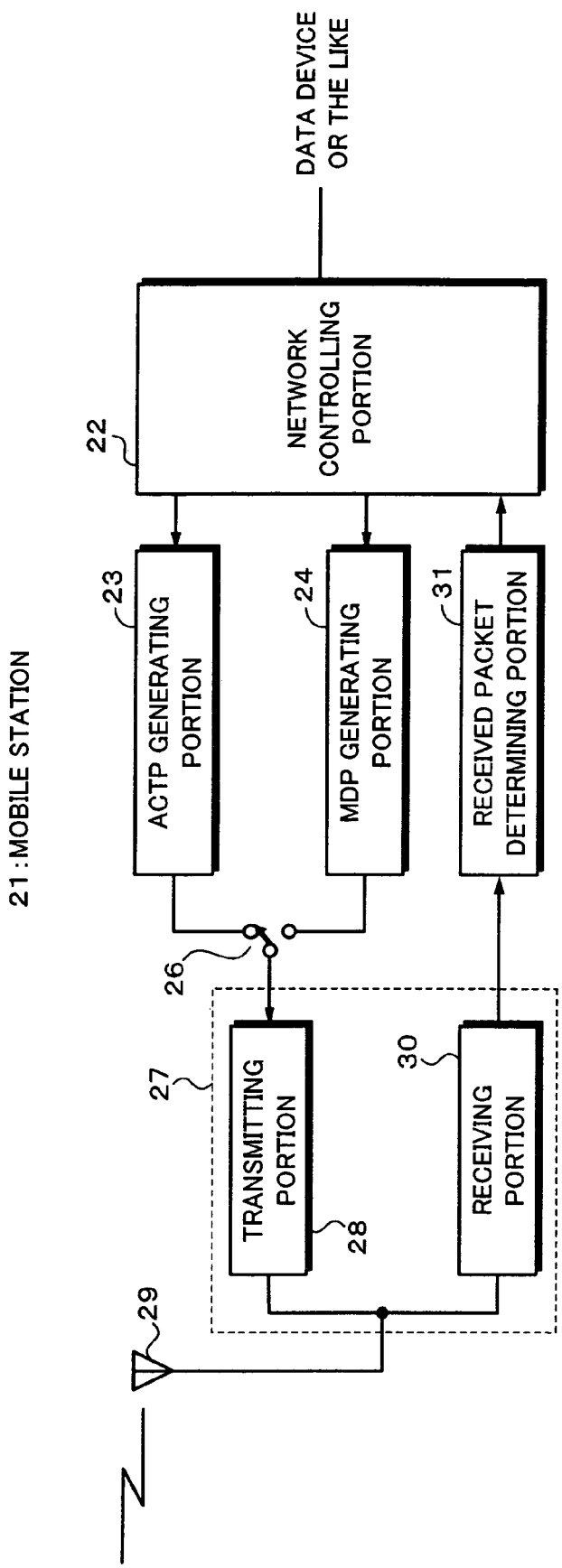
FIG. 2 is a block diagram showing an example of the structure of a mobile station.

Next, with reference to FIG. 2, an example of the structure of each mobile station will be described. In FIG. 2, a data device is connected to a network controlling portion 22. The data device uses received data or generates transmission data. The data device is for example a cellular phone terminal, a personal computer, a digital broadcasting receiver, a digital camera, a car navigation device, a global positioning system (GPS), a display, an audio system, or the like.

Connected to the network controlling portion 22 are an activation packet (ACTP) generating portion 23 and an MDP generating portion 24. Disposed between the ACTP generating portion 23 and the MDP generating portion 24 and a transmitting portion 28 included in a radio device 27 is a selector 26. Data selected by the selector 26 are supplied to the transmitting portion 28. A radio signal supplied form the transmitting portion 28 is radiated from an antenna 29 and uploaded to the base station 1. The MDP is transmitted with a message data slot (MDS) of a frame of the uplink channel. On the other hand, the ACTP is transmitted with an activation slot (ACTS) of a frame of the uplink channel.

When the mobile station 21 has entered the communication area of the base station 1, the ACTP generating portion 23 generates the ACTP and transmits it to the base station 1 with the ACTS of a frame of the uplink channel. When the base station 1 has successfully registered the mobile station 21, it can communicate with the base station 1 using the uplink channel. When the base station 1 has allocated a slot of a frame of the uplink channel to the mobile station 21, the MDP generating portion 24 generates the MDP.

The base station 1 receives an upload request, a download request, and user data from the mobile station 21, and response information against data transmitted through the downlink channel with the MDP. The base station 1 exchanges the response data with the mobile station 21 against data transmitted with the FCMS using slots of a frame of the uplink channel and a frame of the downlink channel. The ACTP contains information necessary for registering the mobile station 21 to the base station 1.

When the mobile station 21 downloads data from the base station 1, the mobile station 21 receives the FCMP and the MDP from the base station 1 through the antenna 29 with the FCMS and MDS, respectively. A signal received by the antenna 29 is supplied to a received packet determining portion 31. The received packet determining portion 31 determines whether the received packet is the FCMP or MDP. In addition, the received packet determining portion 31 determines whether the received packet is for the mobile station 21 or another mobile station. The received packet determining portion 31 supplies the received packet to the data device through the network controlling portion 22.

Figure 3:
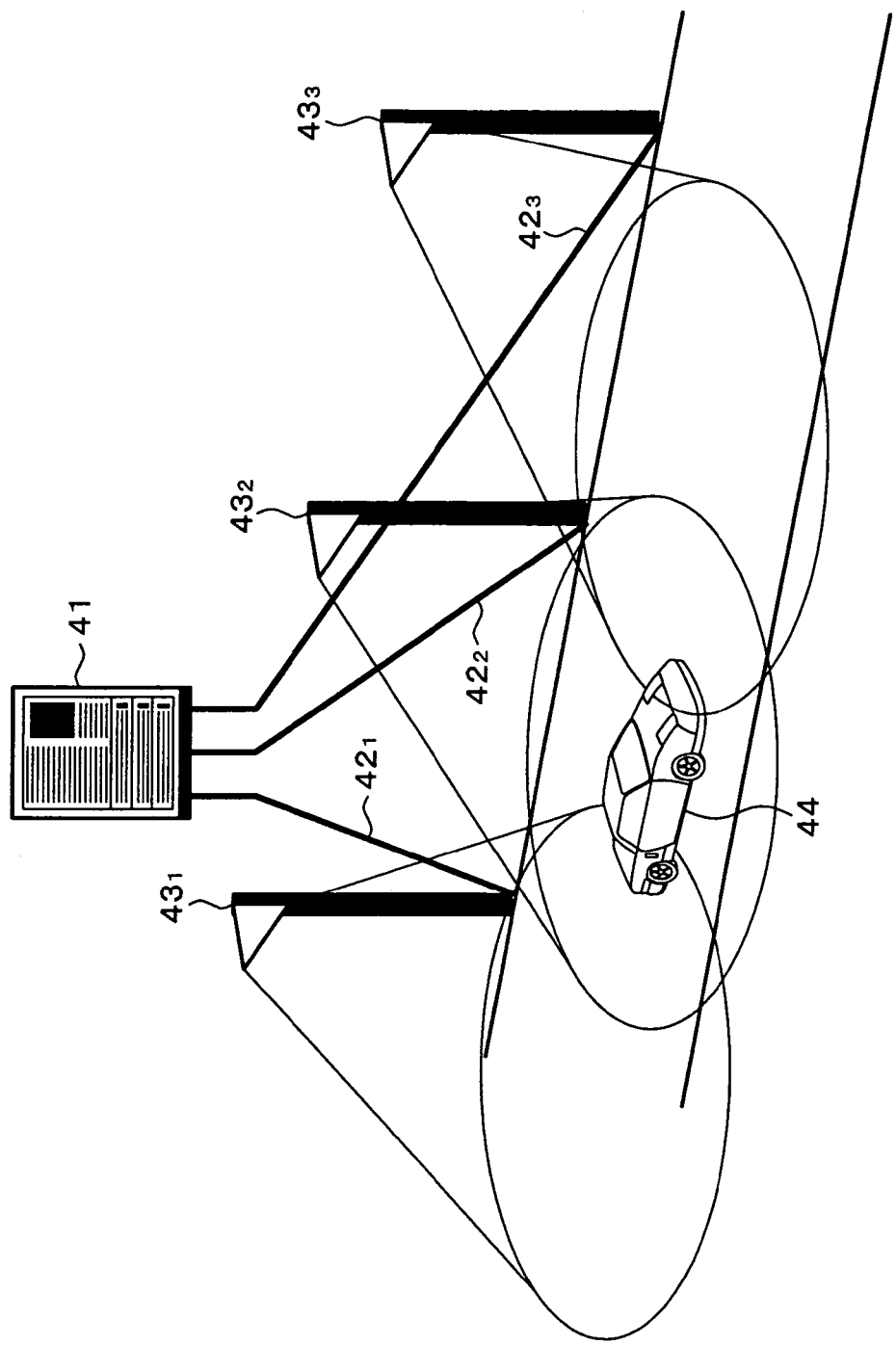
FIG. 3 is a schematic diagram showing an outline of an inter-vehicle communicating system.

The base station 1 (shown in FIG. 1) and the mobile station 21 (shown in FIG. 2) correspond to for example a base station and a mobile station disposed in a vehicle in an inter-vehicle communicating system, respectively. In reality, the present invention can be applied to an inter-vehicle communicating system shown in FIG. 3. The system shown in FIG. 3 is composed of an integrated base station 41, optical fibers $42_1$, $42_2$, . . . and so forth, and a plurality of local base stations $43_1$, $43_2$, . . . , and so forth. The local base stations $43_1$, $43_2$, . . . , and so forth are disposed along for example a road at predetermined intervals. The local base stations $43_1$, $43_2$, . . . , and so forth can communicate with a mobile station disposed in a vehicle 44. Other than the antenna are disposed in the integrated base station 41. Antennas are disposed in the local base stations $43_1$, $43_2$, . . . , and so forth.

In the inter-vehicle communicating system, the integrated base station 41 generates the MDP and FCMP that have been modulated in accordance with the predetermined radio modulating system. The resultant radio frequency signal is converted into an optical signal by a radio frequency signal—optical signal converting device. The radio frequency signal—optical signal converting device converts an optical signal of for example a laser diode. Alternatively, the radio frequency signal—optical signal converting device converts a radio frequency signal into an optical signal using an optical converter. The optical signal is transmitted to at least one of the local base stations $43_1$, $43_2$, . . . , and so forth through the optical fibers $42_1$, $42_2$, . . . and so forth. In the local base stations $43_1$, $43_2$, . . . , and so forth, an optical signal—radio frequency signal converting device typified by a photo diode converts an optical signal into a radio frequency signal. The radio frequency signal is transmitted with the MDP and FCMP from an antenna disposed along the road to the mobile station.

The mobile station disposed in the vehicle 44 has an antenna that receives a radio signal radiated from the roadside antenna and a connecting portion that sends the radio signal received by the antenna to a cellular phone or a broadcasting receiver. When data are uplinked, the ACTP and MDP modulated in accordance with a predetermined radio modulating system are received from the mobile station by the local base stations $43_1$, $43_2$, . . . , and so forth. The received ACTP and MDP are converted into an optical signal by a radio frequency signal—optical signal converting device that operates in the same theory as the foregoing radio frequency—optical signal converting device. The optical signal is transmitted to the integrated base station 41 through the optical fibers $42_1$, $42_2$, . . . and so forth. In the integrated base station 41, an optical signal—radio frequency signal converting device that operates in the same theory as the foregoing optical signal—radio frequency signal converting device converts the optical signal into a radio frequency signal. As a result, the ACTP and MDP transmitted from the mobile station are received.

Radio frequencies and intermediate frequencies modulated for cellular phones and broadcasts by a frequency converting, multiplexing, and demultiplexing device disposed in the integrated base station 41 may be multiplexed so that they are contained in a particular frequency band for example a millimeter wave band and radiated from a rodeside antenna. In this case, the mobile station disposed in the vehicle 44 has an antenna having sensitivity in a common frequency band, a frequency converting and demultiplexing device that converts a radio frequency signal received from the antenna into discrete radio frequency signals and intermediate frequency signals and distributes the converted signals, and a connecting portion that sends the discrete radio frequency signals and intermediate frequency signals to the cellular phone and the broadcasting receiver.

The base station 1 shown in FIG. 1 corresponds to all the integrated base station 41 and local base stations 43₁, 43₂, . . . , and so forth of the system shown in FIG. 3. The mobile station 21 shown in FIG. 2 corresponds to the mobile station disposed in the vehicle 44. In this example, the downlink channel from the base station 1 to the mobile station 21 and the uplink channel from the mobile station 21 to the base station 1 are simultaneously communicated.

The protocol of the present invention corresponds to the second layer (data link layer) of the OSI reference model. The data link layer is further divided into a media access control (MAC) layer and an logical link control (LLC) layer disposed above the MAC layer. FIG. 4A shows an example of the structure of a TDMA frame. One TDMA frame of the downlink channel is composed of one FCMS and a plurality of (n) MDSs.

One TDMA frame of the uplink channel is composed of one ACTS and a plurality of MDSs. The ACTS is composed of a plurality of mini slots. The frame period of a frame of the downlink channel is the same as that of a frame of the uplink channel. However, the slot period of a frame of the downlink channel is different from that of a frame of the uplink channel. Next, each slot will be described.

One TDMA frame always has one FCMS. The slot FCMS is allocated at the beginning of a TDMA frame. The FCMS is a slot dedicated for the downlink channel. The FCMS contains information about the base station, slot allocation information for frames of the downlink and uplink channels, acknowledgment (ACK) information against data of the uplink channel (user data). If the base station 1 detects an error, the base station 1 sends back negative acknowledgment (NACK) to the mobile station with the FCMS. In this case, the mobile station re-transmits the data from which the base station 1 has detected an error.

At least one MDS is allocated to one TDMA frame of the uplink channel and one TDMA frame of the downlink channel. In the downlink channel, the base station multiplexes the MDSs. In the uplink channel, a plurality of mobile stations MS multiplex the MDSs. The MDS is used for normal data communication. In the downlink channel, the base station uses the MDS to transmit registration—deregistration response (notification) and connection setup—connection release response (notification). In the uplink channel, the mobile station uses the MDS to transmit the ACK against data of the downlink channel (user data) to the base station.

The ACTS is allocated to one TDMA frame of the uplink channel. The ACTS is a random accessible slot. The mobile station uses the ACTS to transmit a registration—deregistration request to the base station. The mobile station may use the ACTS to transmit a connection setup—connection release request and so forth to the base station. The ACTS is composed of a plurality of mini slots. When the mobile station transmits a request to the base station, the mobile station randomly selects one of the mini slots of the ACTS and transmits the request to the base station in the selected time period of the ACTS.

A frame of the downlink channel has an FCMS that contains slot allocation information and a data slot MDS. However, a frame of the uplink channel does not have a slot for the ACK. In the uplink channel, the ACK against data of the downlink channel is transmitted with the MDS. In addition, slots for a download request and a upload request slot are not provided. A request is transmitted with the ACTS at the beginning of a frame of the uplink channel.

FIG. 4B shows a basic packet format of the FCMP, MDP, and ACTP. One slot is composed of a preamble PR, a unique word UW, a packet, and a guard time GT arranged in the order. The preamble and the unique word may be referred to as a header portion. In addition, the packet is a portion of which the preamble, the unique word, and the guard time are excluded from the slot. As shown in FIG. 4C, the packet is composed of a header having a fixed length and a payload having a variable length.

The guard time is disposed to prevent bursts from colliding due to the difference between transmission delays of terminals. Since the slot period of a frame of the uplink channel is different from the slot period of a frame of the downlink channel, their guard time lengths may differ from each other. However, the guard times of slots of a frame of the uplink channel are the same. Likewise, the guard times of slots of a frame of the downlink channel are the same.

The length of the header portion composed of the preamble and the unique word is decided in accordance with the desired reliability for the FCMS, MDS, and ACTS.

Figure 5:
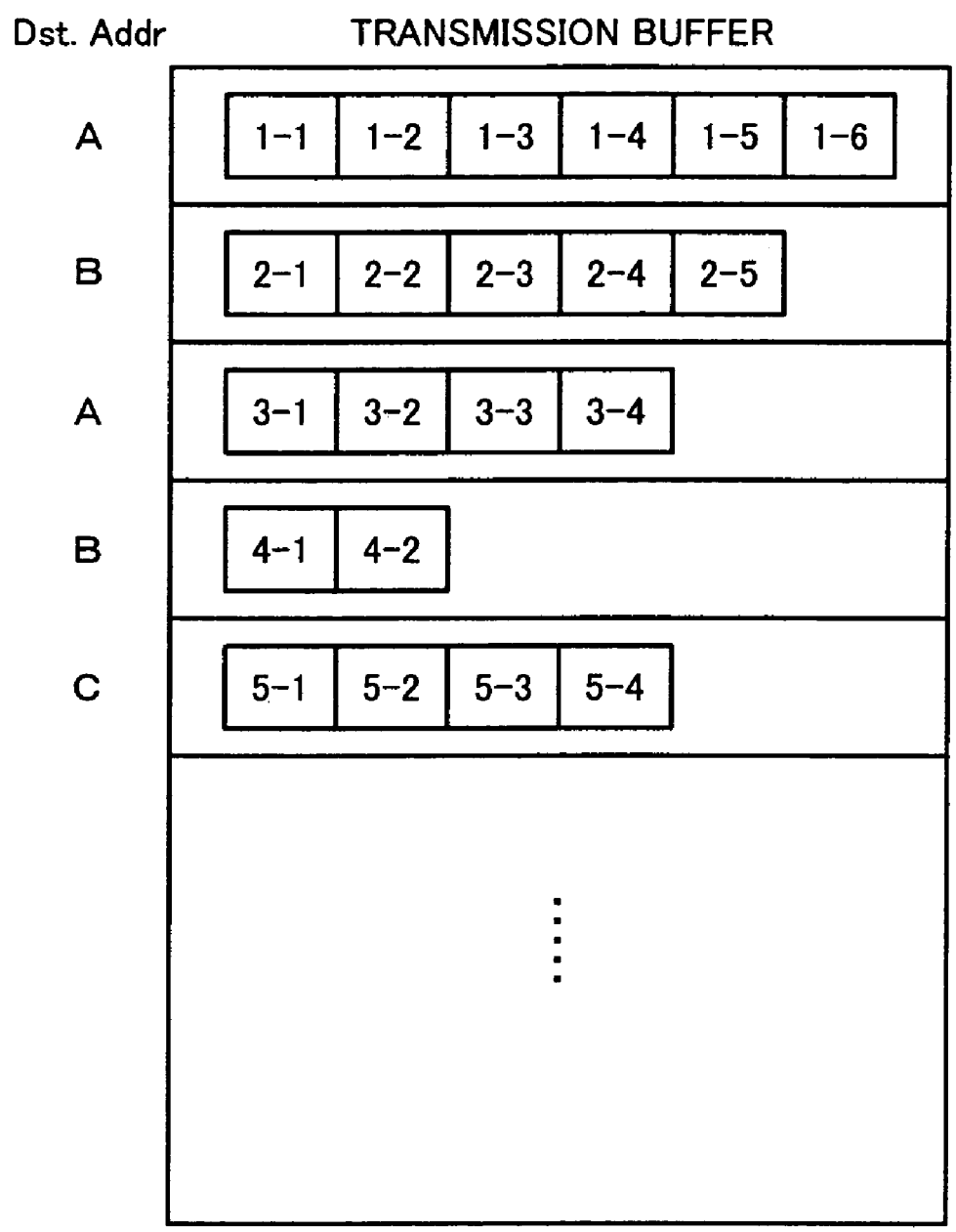
FIG. 5 is a schematic diagram showing an example of data stored in a transmission buffer.

Next, the slot allocation system and the transmission of the ACK in the downlink channel will be described. FIG. 5 shows an example of the contents of a transmission buffer of the base station. Recipient addresses (addresses of mobile stations) are designated by A, B, C, . . . , and so forth. Data (1-1, 1-2, 1-3, . . . , and 1-6) stored in the first one line of the transmission buffer are a block of data (hereinafter referred to as a sequence) transmitted to the recipient address A. The last packet 1-6 contains an EOD that represents the end of the data. This sequence is also referred to as an upper layer protocol data unit (PDU). The sequence corresponds to one Ethernet packet or an IP packet to be transmitted to each mobile station. Likewise, data (2-1, 2-2, . . . , and 2-5) are data of sequence number 2 to be transmitted to the recipient address B. Likewise, data to be transmitted to the recipient addresses A, B, and C are shown. In the drawing, 1-1, 1-2, . . . and so forth represent packets (MDPs) allocated in the MDSs.

When data to be transmitted are stored in the transmission buffer, there are three methods for allocating slots of frames of the downlink channel. The first method is called the FIFO (First-In First-Out) method. The second method is called the round robin method. The third method is called the modified FIFO method. Next, these three methods will be described in succession.

Figure 6:
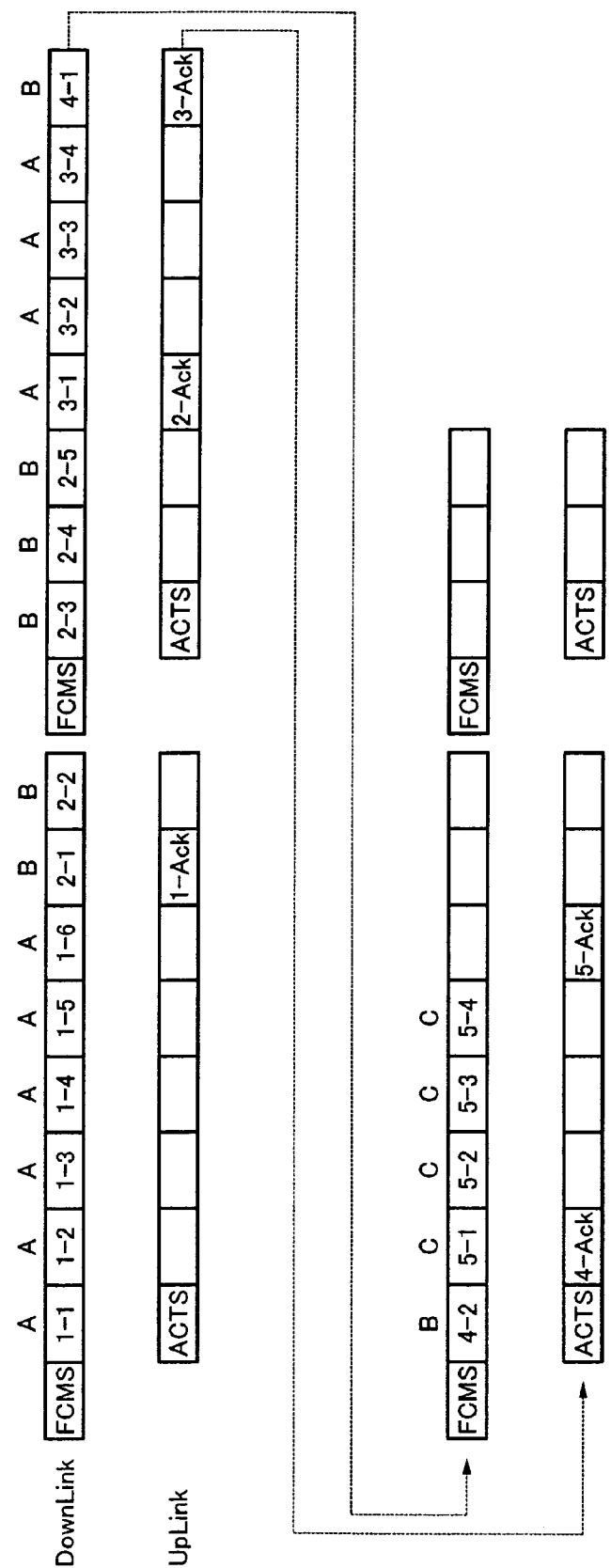
FIG. 6 is a schematic diagram showing an example of a slot allocating system.

FIG. 6 shows the FIFO method. In the downlink channel, packets are allocated in slots of a TDMA frame in the order that these packets have been stored in the transmission buffer. In the example, one TDMA frame of the downlink channel is composed of one FCMS and eight MDSs. When the mobile station of the recipient address A normally receives one sequence of data, the mobile station sends back the ACK to the base station with the MDS of a frame of the uplink channel. When the mobile station receives data (1-1, . . . , and 1-6) of the sequence number 1, the mobile station sends back 1-ACK to the base station with the MDS. Likewise, whenever each mobile station receives each sequence of data, the mobile station sends back the ACK to the base station.

Figure 7:
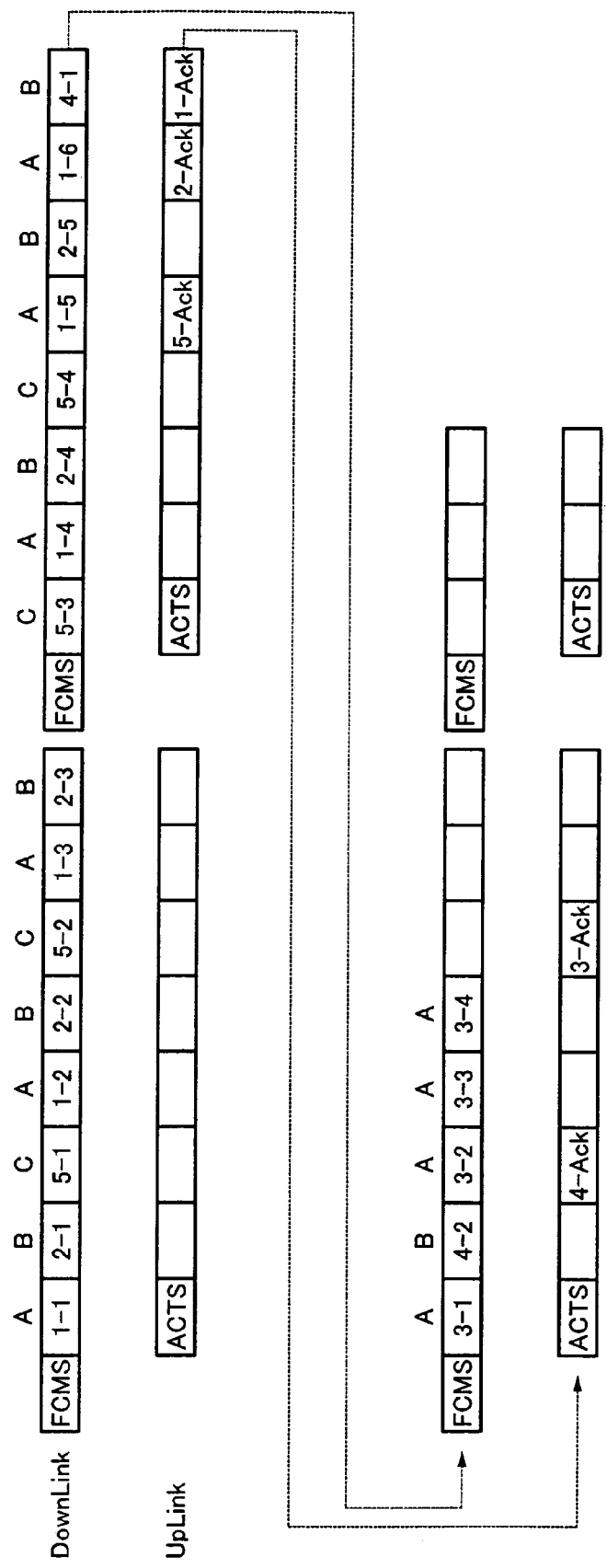
FIG. 7 is a schematic diagram showing an example of another slot allocating system.

FIG. 7 shows the round robin method. In the round robin method, the base station asks each mobile station of recipient address whether or not the transmission buffer stores data to be transmit to each mobile station. When the transmission buffer stores data to be transmitted to the mobile stations, the data are transmitted to the mobile stations with slots of frames of the downlink channel. In this example, the transmission buffer stores data to be transmitted to the mobile stations of the recipient addresses A, B, and C, the base station repeatedly and successively asks the mobile stations of the recipient addresses A, B, and C whether or not to the transmission buffer stores data to be transmitted to the mobile stations. In the example shown in FIG. 5, the base station completes the transmission of data of sequence number 5 to the mobile station of the recipient address C at first. Thereafter, the base station repeatedly and successively asks the mobile stations of the recipient addresses A and B whether or not to the transmission buffer stores data to be transmitted to the mobile stations. After the base station has completely transmitted data of sequence number 2 to the mobile station of the recipient B, the base station allocates only data for the mobile station of the recipient address A to slots of frames of the downlink channel. Like the FIFO method, each mobile station returns the ACK to the base station through the uplink channel whenever the mobile station has received one sequence of data.

Figure 8:
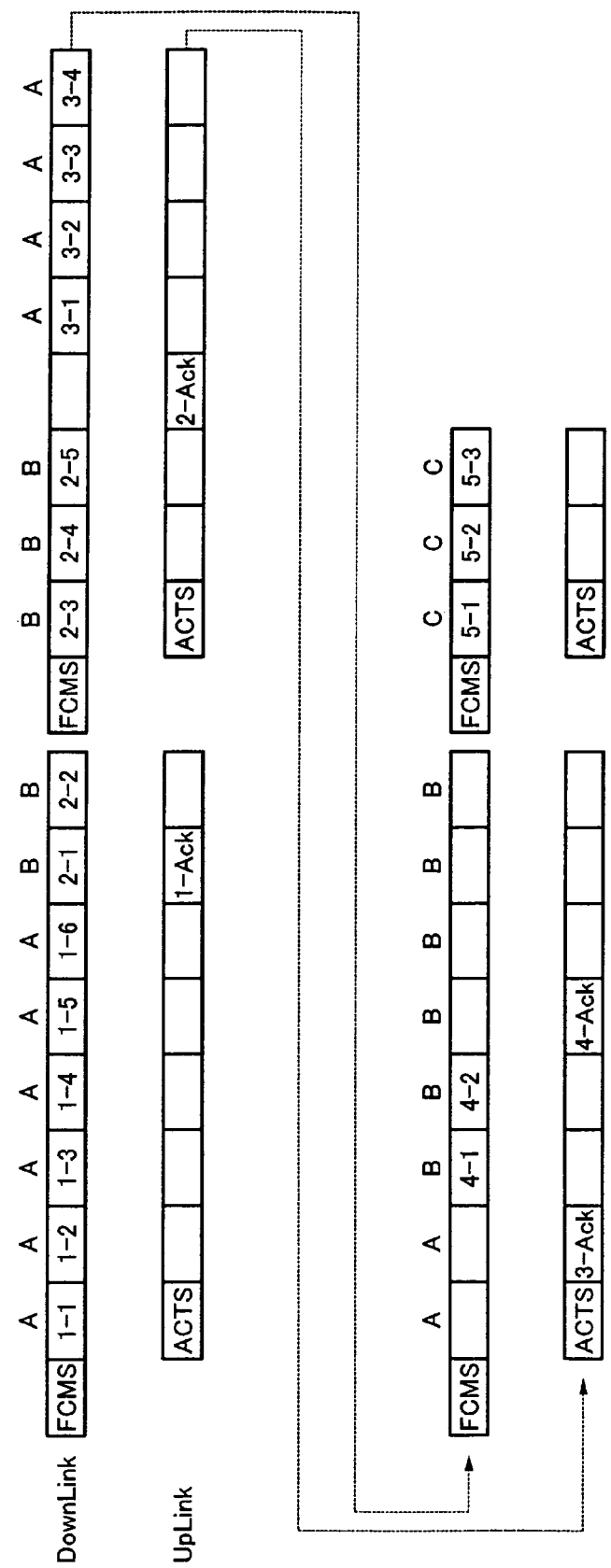
FIG. 8 is a schematic diagram showing an example of a further slot allocating system.

FIG. 8 shows the modified FIFO method. This method is the same as the FIFO method in that data are allocated in slots of frame of the downlink channel in the order of which the data have been input. When one sequence of data does not satisfy a predetermined number of packets (in this example, six packets), the remaining slots are kept blank. Whenever each mobile station receives one sequence of data, the mobile station sends back the ACK to the base station.

Thus, according to the protocol of the present invention, each mobile station sends back a response signal to the mobile station whenever the mobile station has received one sequence of data. If each mobile station has not correctly received one sequence of data, the mobile station sends back the NACK to the base station. In any of these methods, timing at which one sequence of data is completely received is not fixed. Thus, the ACK is sent back to the base station with the MDS of a frame of the uplink channel. When data have not been correctly received, the data should be re-transmitted. The re-transmitting method will be described later.

Figure 9:
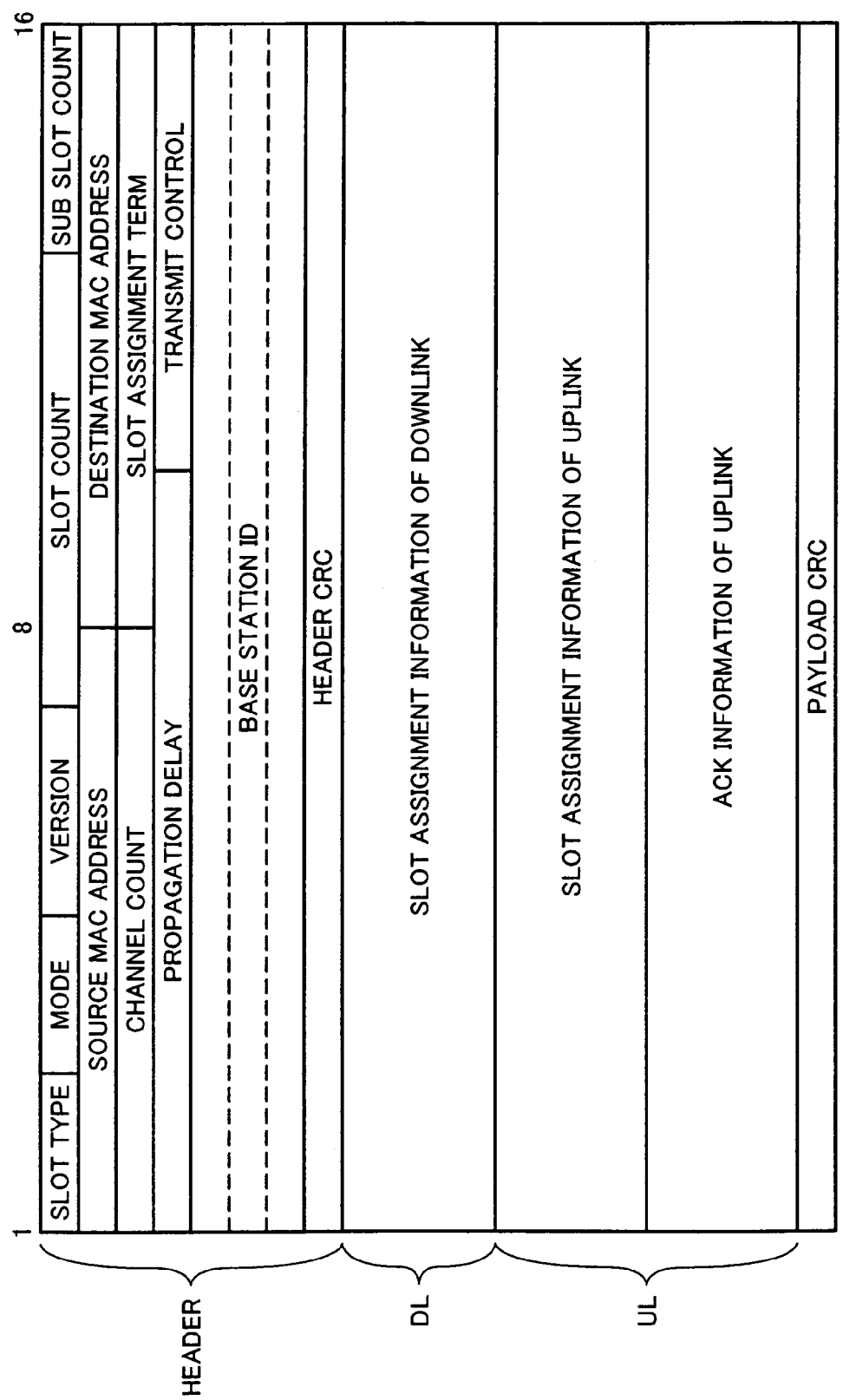
FIG. 9 is a schematic diagram showing the format of a packet FCMP.

FIG. 9 shows an example of the packet format of the FCMS. Each line shown in FIG. 9 has a length of 16 bits (two octets). A header is disposed at the beginning of the packet (on the upper side of the drawing). The header is followed by a payload. The payload is divided into information DL about a frame of the downlink channel and information UL about a frame of the uplink channel. Next, the contents of packets of the FCMS will be described in succession.

Disposed at the beginning of the header is slot type (two bits). The slot type represents the type of the slot. (01b) represents the MDS, (10b) represents the ACTS. Since the slot shown in FIG. 9 is the FCMS, (00b) is set, where b represents bit notation.

Mode (two bits) represents the operation mode of the communicating system. The operation mode is one of the following modes.

(00b): Multimedia station (single BS, single AP) (point type), (01b): Multimedia lane (single BS, plural APs) (short distance linear type), (10b): Advanced multimedia lane (plural BSs, plural APs) (long distance linear type), (11b): Multimedia way (plural BSs, plural APs) (plane type)

Version (two bits) represents the version of each operation mode.

(00b): Version 1, (01b): Version 2, (10b): Version 3, (11b): Version 4

Slot count (six bits) represents the number of MDSs of a frame of the downlink channel and the total number of ACTS and MDSs of a frame of the uplink channel:

(000000b) for one MDS to (111111b) for 64 MDSs. Since the default value of MDSs of a frame of the downlink channel is eight slots, the slot count is set to 7 (000111b).

Sub slot count (four bits) represents the number of sub slots of the ACTS of a frame of the uplink channel.

(0000b) for one sub slot to (1111b) for 16 sub slots Since the default value of the number of sub slots of the ACTS is 3 slots, the sub slot count is set to 2 (0010b).

Source MAC (media access control) address (eight bits) represents the MAC address of the sender. Since the node of the sender of the FCMS is the base station, the logical channel ID of the base station, (00000001b), is set.

Destination MAC address (eight bits) represents the MAC address of the recipient node. Since all the mobile stations are recipient nodes, an indefinite logical channel ID, (11111111b), is set.

Channel count (eight bits) represents the number of logical channels that have been connected. Assuming that when the priority is 1, the number of logical channels is 1, the number of all logical channels that have been currently connected is set. (00000000b) for 0 channel to (11111111b) for 255 channels Slot assignment term (eight bits) represents the period for which the subsequent slot is assigned. After a slot (MDS) of a frame of the uplink channel had been assigned for a mobile station, if valid data has not transmitted from the mobile station, the period for which the subsequent slot is assigned for the mobile station is represented in the unit of TDMA frames. (00000000b) for one period to (11111111b) for 256 periods Sine the default value of the maximum value of the assignment period is five periods, the eight bits are set to (00000100b).

Propagation delay (10 bits) represents a permissible propagation delay typified by an optical fiber portion. The length of the optical fiber is designated in the unit of 50 m. (0000000000b) for 0 m to (1111111111b) for 51150 m, increment of 50 m. In the example of the inter-vehicle communicating system shown in FIG. 3, the lengths of the optical fibers are $42_1$, $42_2$, and $42_3$ are represented.

Transmission control (six bits) represents control information with respect to the slot allocation controlling method and re-transmission controlling method. When the six bits are denoted by (b1, b2, b3, b4, b5, b6), each bit is defined as follows. Bits b4, b5, and b6 are not used. When there are three or more types, two or more bits can be assigned.

b1: Type of assignment controlling method for slots of frames of the downlink channel.

b1=0 (0b): FIFO method b1=1 (1b): Round robin method b2: Type of re-transmission data unit of re-transmission controlling method b2=0 (0b): Segment unit b2=1 (1b): Upper layer PDU method b3: Type of data exchanging method with upper layer b3=0 (0b): Random method b3=1 (1b): Sequential method Base station ID (48 bits) represents the ID of the base station. A unique ID (Ethernet address or the like) that uniquely identifies the base station is set.

Header CRC (cyclic redundancy code) (16 bits) is a generation polynomial for example $1+x^5+x^{12}+x^{16}$. The CRC is an error detection code.

Figure 10A:
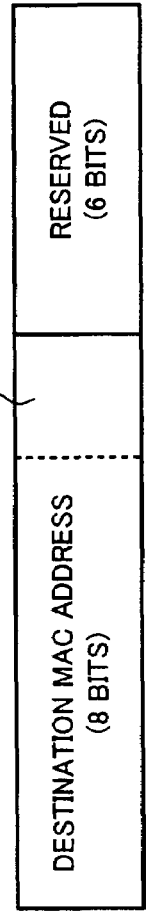
FIGS. 10A, 10B, 10C, and 10D are schematic diagrams showing data formats of a payload of the packet FCMP.

Next, data placed in the payload will be described. As shown in FIG. 10A, slot allocation information of a frame of the downlink channel is designated by DL and divided every two octets (per slot). The slot allocation information is composed of destination MAC address (eight bits), allocation slot type (two bits), and reserved area (six bits).

Destination MAC address represents the MAC address (logical channel ID) of a mobile station that uses each slot. When the slot type is (01b), the MDS is designated, and the packet type is registration/response of a control packet, an indefinite logical channel ID, (11111111b), is set. When there is no transmission data, an impossible logical channel ID, (00000000b), is set. Otherwise, the logical channel ID of a recipient mobile station is set. Allocation slot type (two bits) represents the type of each slot. Slot type designated for a frame of the downlink channel is (MDS: 01b).

Figure 10B:
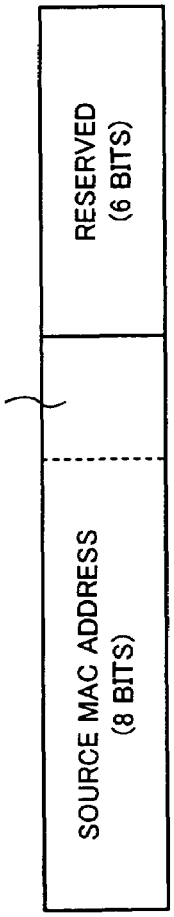

Slot allocation information of a frame of the uplink channel is designated by UL and is divided every two octets (per slot). As shown in FIG. 10B, slot allocation information of a frame of the uplink channel is composed of source MAC address (eight bits), allocation slot type (two bits), and reserved area (six bits).

Source MAC address represents the MAC address (logical channel ID) of a mobile station that uses each slot. When the slot type is (10b) that represents ACTS, an indefinite logical channel ID, (1111111b), is set to source MAC address. In this case, the logical channel ID of a sender mobile station is set.

Allocation slot type represents the type of each slot. For a frame of the uplink channel, (01b) for MDS and (10b) for ACTS are set.

Figure 10C:
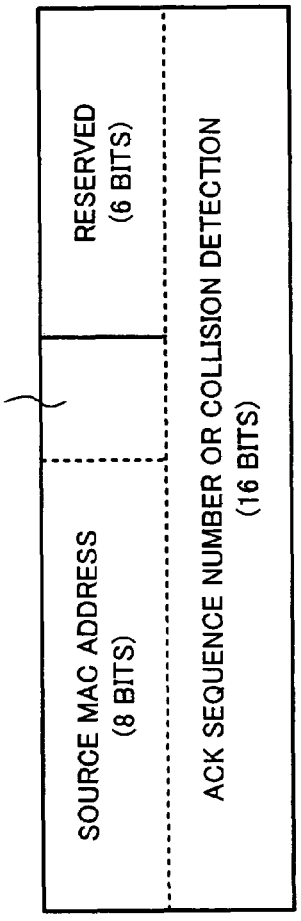
Figure 10D:
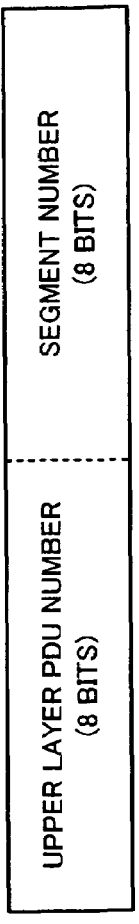

As shown in FIG. 10C, ACK information against data of the uplink channel is divided every four octets (per slot). ACK information is composed of source MAC address (eight bits), control (two bits), reserved area (six bits), and ACK sequence number or collision detection (16 bits).

Source MAC address represents the MAC address (logical channel ID) of a mobile station against ACK information. When a slot for a frame of the uplink channel is used as the ACTS rather than the MDS, an indefinite logical channel ID, (11111111b), is set for the source MAC address. Otherwise, the logical channel ID of a mobile station against the ACK information is set.

Control represents the control information about this allocation. When two bits of control are denoted by (b1, b2), bit b1 represents whether or not ACK sequence number is valid. (b1=0b) represents that ACK sequence number is invalid. (b1=1b) represents that ACK sequence number is valid. Bit b2 represents whether ACK sequence number is ACK or NACK. (b2=0b) represents that ACK sequence number is NACK. (b2=1b) represents that ACK sequence number is ACK.

ACK sequence number (16 bits) represents the sequence number of the ACK. The sequence number of data of uplink channel that have been accurately received is set.

When a slot of a frame of the uplink channel is used as the ACTS rather than the MDS (an indefinite logical channel ID is set for source MAC address), ACK sequence number field is used as collision detection field. Collision detection represents whether or not there was a collision in the preceding ACTS. Since the number of sub slots ranges from 1 to 16, bits of the sub slots represent whether or not there is a collision. (0b) represents that no collision takes place. (1b) represents that a collision takes place.

Payload CRC (16 bits) is disposed at the end of the payload. Payload CRT is a generation polynomial for example $1+x^5+x^{12}+x^{16}$. These data are placed in the payload.

Figure 11:
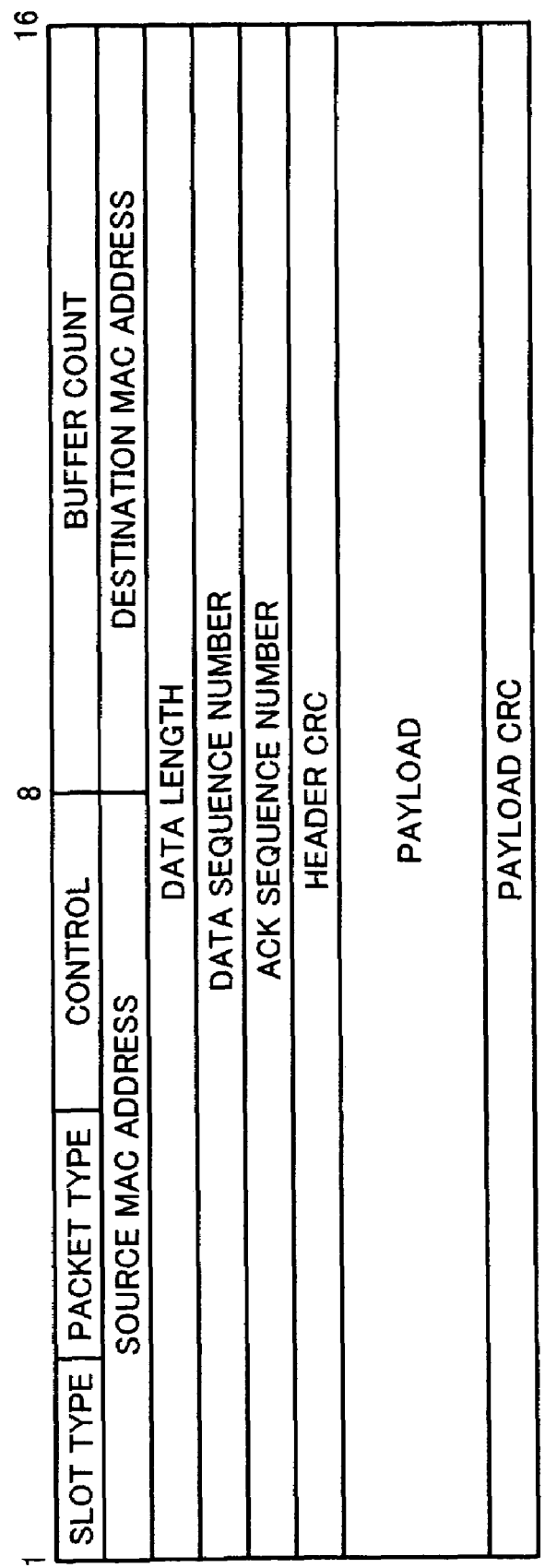
FIG. 11 is a schematic diagram showing the format of a packet MDP.

FIG. 11 shows an example of the packet format of the MDP (message data packet). Each line of FIG. 11 has a length of two octets. A header is disposed at the beginning of the packet (on the upper side of the drawing). The header is followed by a payload. Header CRC (16 bits) is disposed at the end of the header. Payload CRC (16 bits) is disposed at the end of the payload.

First of all, data contained in the header will be described. Slot type (two bits) disposed at the beginning of the header represents the type of the slot. (00b) represents the FCMS. (01b) represents the MDS. (10b) represents the ACTS. Since the slot shown in FIG. 11 is the MDS, (01b) is set.

Packet type (two bytes) represents the type of the packet. (00b) represents a data packet. (01b) represents a control packet. One of these values is set corresponding to the type of the packet for use.

Control (four bits) represents control information of the packet. When the four bits are denoted by (b1, b2, b3, b4), each bit is defined as follows. Bit b1 represents whether or not the payload portion and data sequence number of the packet are valid. (b1=0b) represents invalid (absence of payload, invalid data sequence). (b1=1b) represents valid (presence of payload, valid data sequence).

Bib b2 represents whether or not the packet is the last packet of the upper layer PDU. (b2=0b) represents that the packet is placed at the beginning or in the middle of the upper layer PDU. (b2=1b) represents that the packet is placed at the end of the upper layer PDU. Bit b3 represents whether or not ACK sequence number of the packet is valid. (b3=0b) represents that ACK sequence number is invalid. (b3=1b) represents that ACK sequence number is valid. Bit b4 represents whether or not ACK sequence number is ACK or NACK. (b4=0b) represents that ACK sequence number is NACK. (b4=1b) represents that ACK sequence number is ACK.

Buffer count (eight bits) represents the number of data packets stored in the transmission buffer. The number of data packets stored in the transmission buffer of the MAC layer is set. When the number of data packets is 256 or greater, (11111111b) is set.

Source MAC address (eight bits) represents the MAC address of the sender node. For the downlink channel, the logical channel ID of the sender base station, (00000001b), is set. For the uplink channel, the logical channel ID of the sender mobile station is set.

Destination MAC address (eight bits) represents the MAC address of the recipient node. For the downlink channel, when the packet type is a data packet, the logical channel ID of the recipient mobile station is set. When the packet type is a control packet for registration response, an indefinite logical channel ID, (11111111b), is set. Otherwise, (when the packet type is a control packet for deregistration response, connection setup response, or connection release response, the logical channel ID of the recipient mobile station is set. For the uplink channel, the logical channel ID of the recipient base station, (00000001b), is set.

Data length (16 bits) represents the payload length of the packet in octets (eight bits). When all the 16 bits of data length are 0's, data length is one octet. When all the 16 bits of data length are 1's, data length is 65536 octets. In this example, since the payload length is 256 octets, (0000000011111111b) is set as data length.

Data sequence number (16 bits) represents the sequence number of data of 256 octets for re-transmission control. The data length needs to be shorter than the maximum length of an IP packet. For example, data length is 256 octets.

ACK sequence number (16 bits) represents the sequence number of the ACK. A sequence number of data that have been accurately received is set. For the downlink channel, the field of ACK sequence number is not used.

Header CRC (16 bits) is a generation polynomial for example $1+x^5+x^{12}+x^{16}$. These data are placed in the header.

In the payload, PDU of LLC is set. After the payload, payload CRC (16 bits) is disposed. In payload CRT, the same generation polynomial as the header CRC is used.

Figure 12:
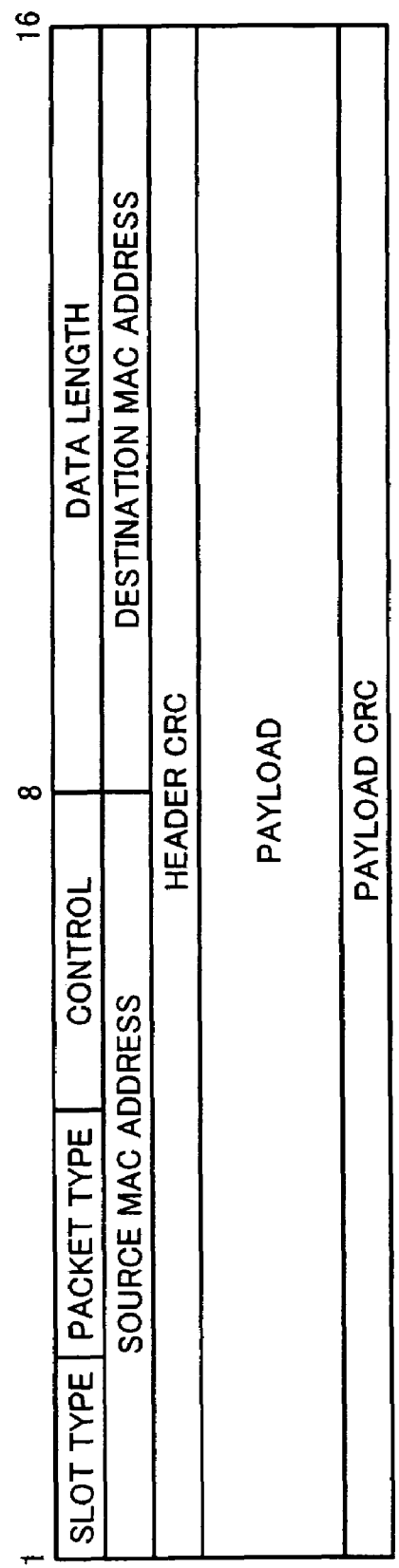
FIG. 12 is a schematic diagram showing the format of a packet ACTP.

FIG. 12 shows an example of the packet format of the ACTP (activation packet) placed in the ACTS. Each line of FIG. 12 has a length of two octets. A header is disposed at the beginning (on the upper side of the drawing) of the packet. The header is followed by a payload. Header CRC (16 bits) is disposed at the end of the header. Payload CRC (16 bits) is disposed at the end of the payload.

Slot type (two bits) disposed at the beginning of the header represents the type of the slot. (00b) represents the FCMS. (01b) represents the MDS. (01b) represents the ACTS. Since this slot is the ACTS, (10b) is set.

Packet type (two bits) represents the type of the packet. Since this slot uses only a control packet, (01b) is set.

Control (four bits) represents control information of the packet. The four bits denoted by (b1, b2, b3, b4) are not used (undefined).

Data length (eight bits) represents the length of the payload of the packet in octets (eight bits). When all the eight bits of data length are 0's, data length is one octet. When all the eight bits of data length are 1's, data length is 256 octets.

Source MAC address (eight bits) represents the MAC address of the sender node. When the packet is registration request, an impossible logical channel ID, (00000000b), is set. Otherwise, (when the packet is deregistration request, connection setup request, or connection release request), the logical channel ID of the sender mobile station is set.

Destination MAC address (eight bits) represents the MAC address of the recipient node. When the packet is registration request, an indefinite logical channel ID, (11111111b), is set. Otherwise, (when the packet is deregistration request, connection setup request, or connection release request), the logical channel ID of the recipient base station, (00000001b), is set.

Header CRT (16 bits) is a generation polynomial for example $1+x^5+x^{12}+x^{16}$. These data are placed in the header.

In the payload, PDU of LLC is set. After the payload, payload CRC (16 bits) is disposed. In payload CRT, the same generation polynomial as the header CRC is used.

Next, the slot allocation controlling method will be described. For the downlink channel, in addition to a slot for an FCMS, slots for MDSs are allocated. MDSs of a frame of the downlink channel are categorized as MDSs for user data and MDSs for call control data such as registration performed when the mobile station has entered the radio zone (registration—deregistration response (notification) and connection setup—connection release response (notification)). Since call control data is more important than user data, if there are call control data to be transmitted, slots are allocated for call control data with higher priority than user data.

Higher priority: MDSs for call control data (registration—deregistration response, connection setup—connection release response)

Lower priority: MDSs for user data (data—re-transmission data)

After slots are allocated for call control data, slots that have not allocated for call control data are allocated for user data. When slots are allocated for user data, a slot allocation management table is referenced. FIG. 13A shows an example of the slot allocation management table.

Connection setup MAC address represents the MAC address (logical channel ID) of a mobile station that has been connected. Connection priority corresponds to the number of slots allocated in accordance with the round robin method. Connection setup MAC address is the same setup value as the connection management table managed by the LLC portion. Downlink transmission buffer status represents the number of data packets stored in the transmission buffer of the base station. Uplink transmission buffer status corresponds to the setup value of the field of buffer count contained in the MDPs transmitted from the mobile station. Whenever the base station receives the MDP from a mobile station, the base station updates uplink transmission buffer status.

Slots are equally allocated for mobile stations that have been connected to the base station in accordance with the round robin method. However, the slots that are allocated in accordance with the round robin method depend on the priorities of the connections. For a mobile station whose downlink transmission buffer status is 0 (namely, there are no data to be transmitted to the mobile station), no slot is allocated to the mobile station. When the transmission buffer does not store data for all slots (packets), the rest of the slots are not allocated. With a slot for which data are not transmitted, (1010b) packets can be transmitted.

When the contents of the slot allocation management table are as shown in FIG. 13A, if there are no call control data to be transmitted, slots of one TDMA frame of the downlink channel are allocated as shown in FIG. 13B. Since the mobile station (A) does not have data to transmit, the first data slot of the frame is allocated for the mobile station (B). Next, although a slot is allocated for the mobile station (C), since connection priority is "2," two slots are allocated for the mobile station (C). Thereafter, a slot is allocated for the mobile station (D). In the same manner, slots are allocated for the mobile stations until there are no data stored in the downlink transmission buffer. In the case shown in FIG. 13A, since the number of data packets is 7, the last slot of the TDMA frame of the downlink channel becomes an blank slot. The next round robin allocation starts with the mobile station whose MAC address is "A."

Figure 14A:
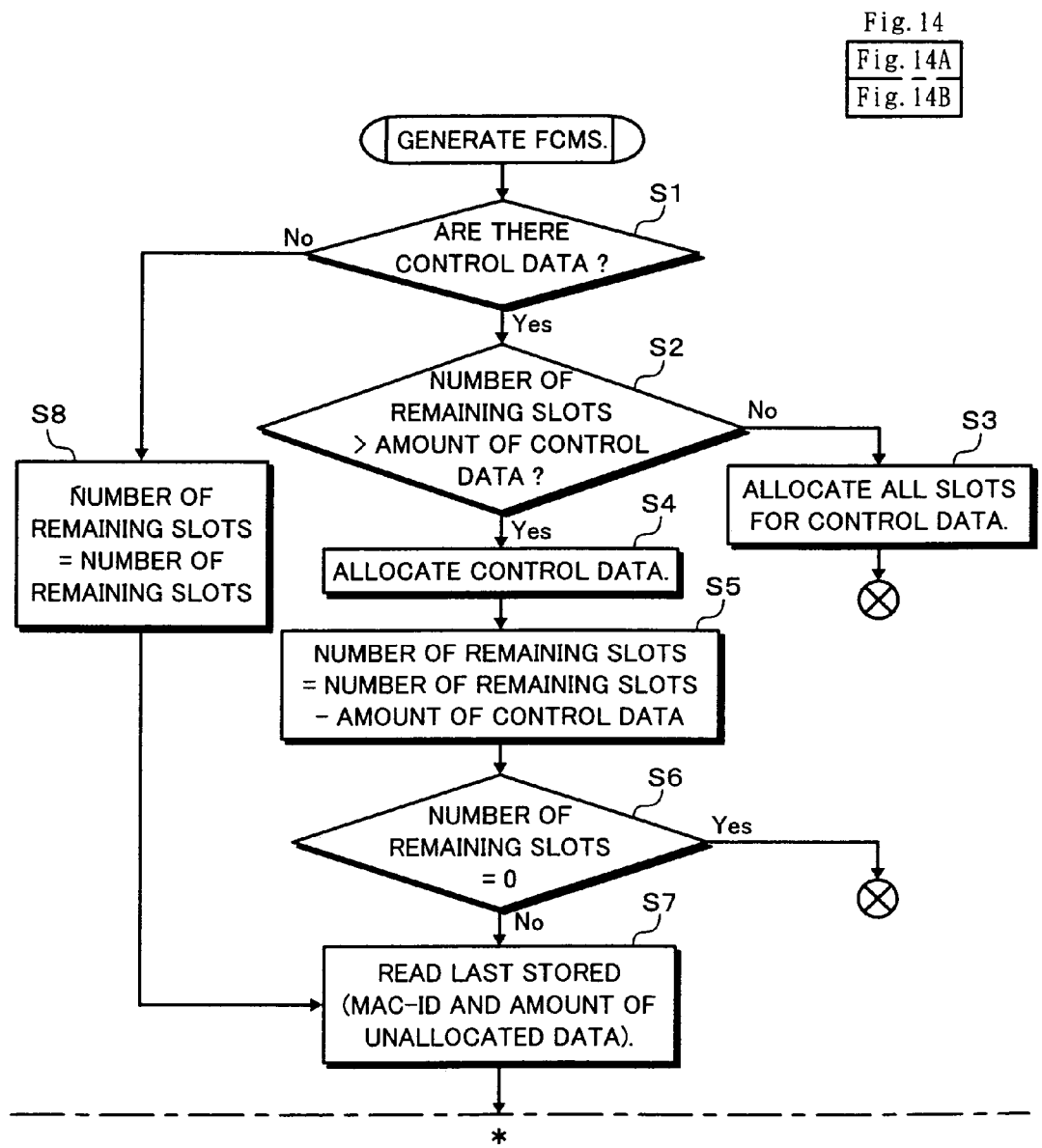
FIGS. 14A and 14B illustrate a first part of a flow chart describing an operation of a slot allocating process for a frame of the downlink channel.
Figure 14B:
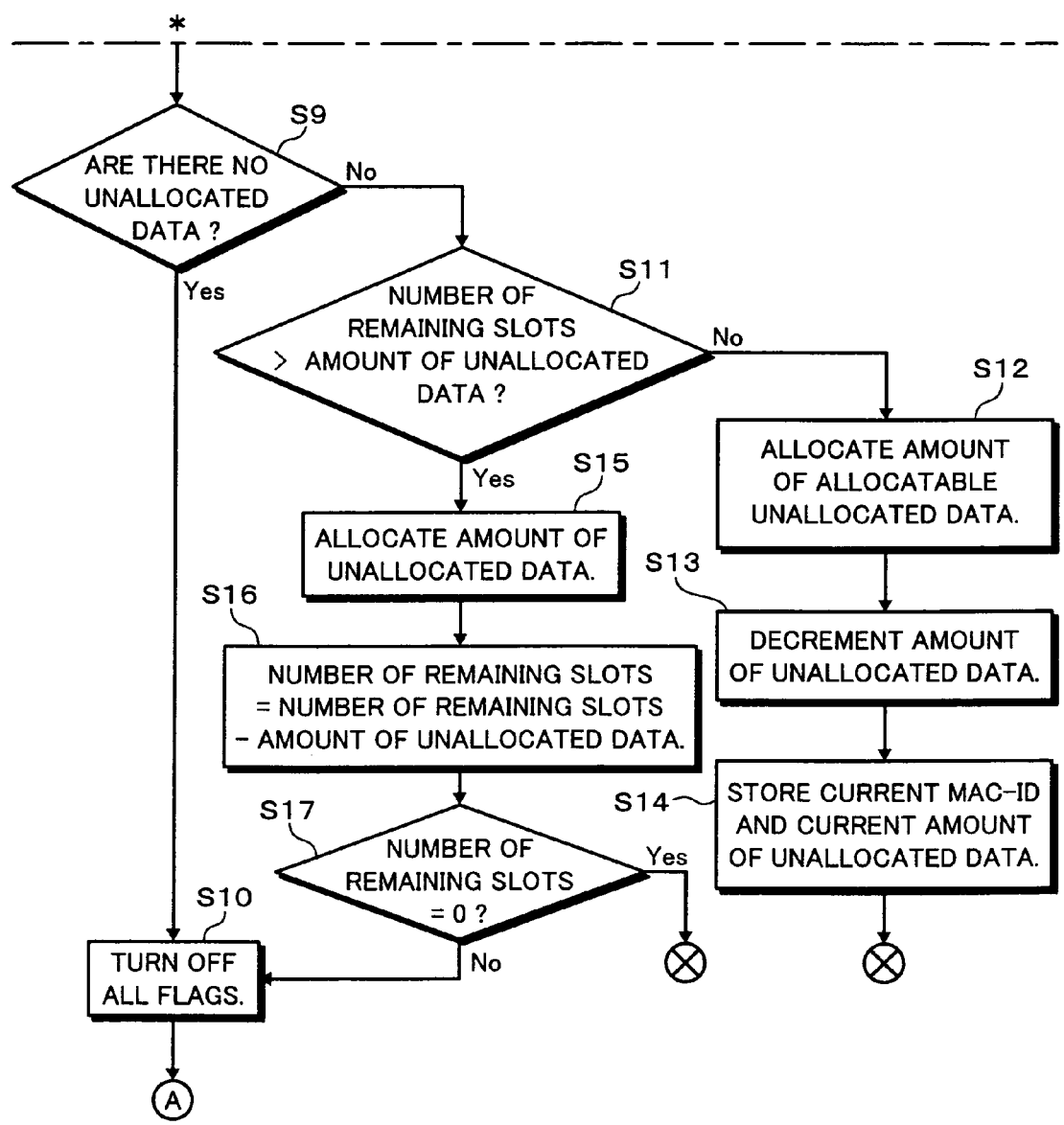
Figure 15A:
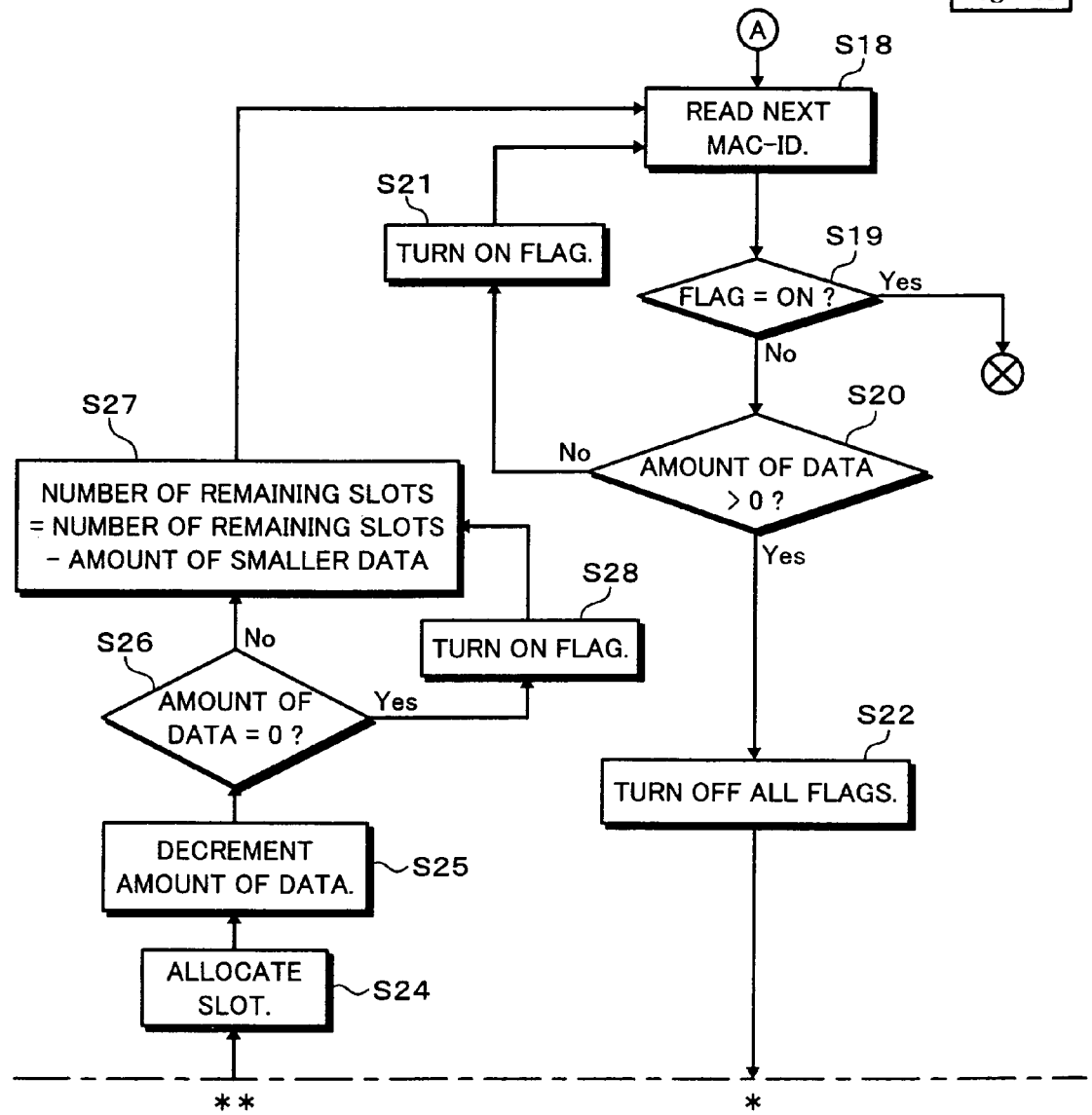
FIGS. 15A and 15B illustrate a second part of the flow chart shown in FIG. 14.
Figure 15B:
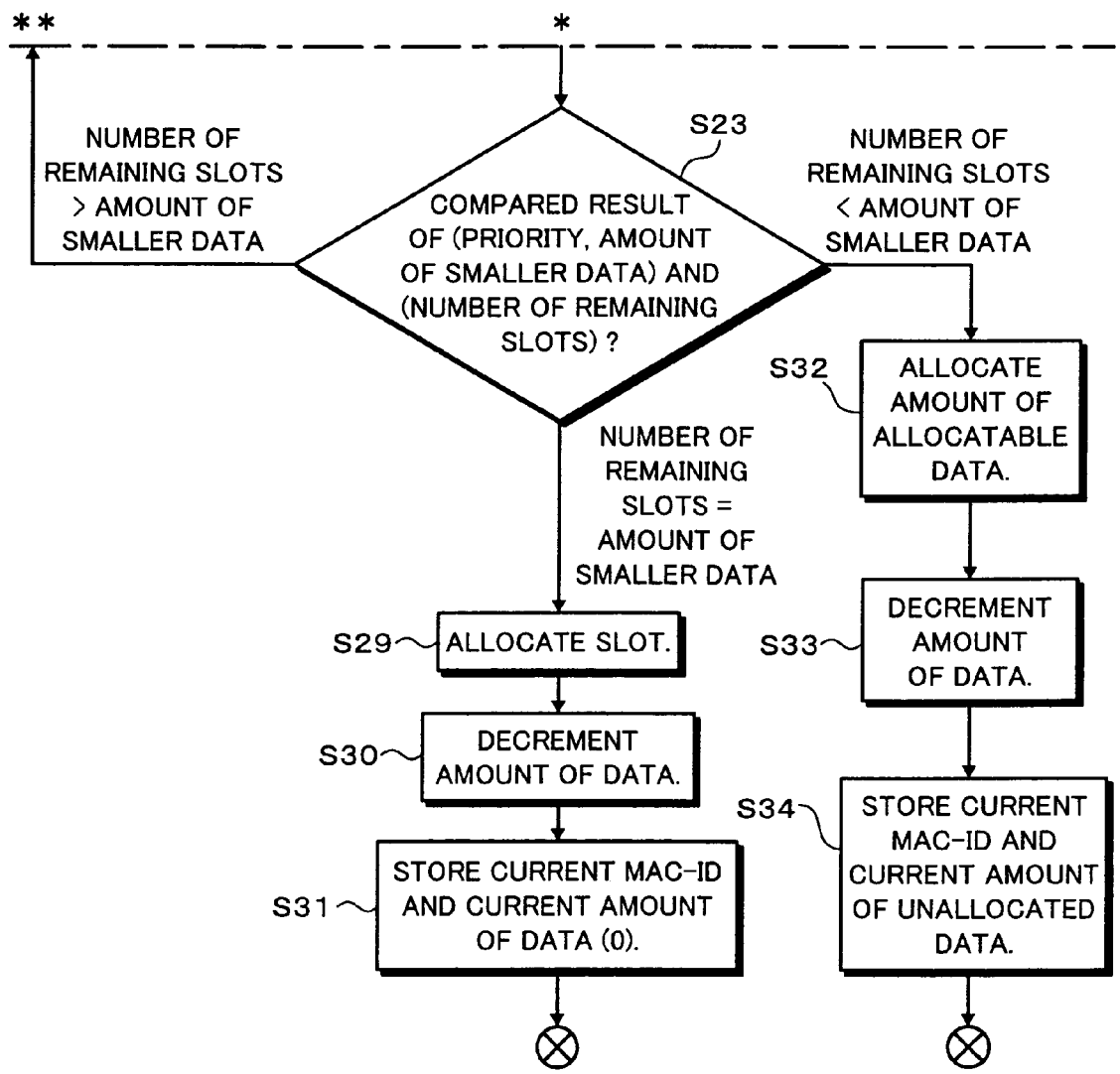

FIG. 14 and FIG. 15 are a flow chart of a slot allocating process for a frame of the downlink channel, namely a process for generating the FCMS. The allocating process is performed in accordance with for example the round robin method. Alternatively, the allocating process may be performed in accordance with the FIFO method (shown in FIG. 6) or the modified FIFO method (shown in FIG. 8). Although these drawings show a sequence of one process, due to the restricted drawing space, the flow chart is drawn as two parts shown in FIG. 14 and FIG. 15.

At step S1, it is determined whether or not there are control data (call control data). The call control data are allocated to slots with higher priority than user data. When there are control data, the flow advances to step S2. At step S2, the number of remaining slots (the number of remaining blank slots in one TDMA frame) is compared with the amount of control data. When the amount of control data is larger than the number of remaining slots, all the slots are allocated for the control data (at step S3). Then, the process is completed.

When the determined result at step S2 represents that the number of remaining slots is larger than the amount of control data, the control data is allocated for the remaining slots (at step S4). Thus, at step S5, the relation of (number of remaining slots=number of remaining slots−amount of control data) is satisfied. At step S6, it is determined whether or not the number of remaining slots is 0. When the number of remaining slots is 0, the allocating process is completed.

When the determined result at step S6 represents that there is still a remaining slot, the flow advances to step S7. At step S7, last stored data (MAC-ID and amount of unallocated data) are read. When the determined result at step S1 represents that there are no control data, the number of unallocated slots is not changed (at step S8). Thereafter, the flow advances to step S7.

At step S9, it is determined whether or not there are unallocated data. When the determined result at step S9 represents that there are no unallocated data, the flow advances to step S10. At step S10, all the flags are turned off. When the determined result at step S9 represents that there are unallocated data, the flow advances to step S11. At step S11, the number of remaining slots is compared with the amount of unallocated data. When the amount of unallocated data is larger than the number of remaining slots, the allocatable slots are allocated to the unallocated data (at step S12). The amount of allocated data is subtracted from the amount of unallocated data (at step S13). Thereafter, the flow advances to step S14. At step S14, the current MAC-ID and the current amount of unallocated data are stored. Then, the process is completed.

When the determined result at step S11 represents that the amount of unallocated data is smaller than the number of remaining slots, the remaining slots are allocated for the unallocated data (at step S15). Thus, at step S16, the relation of (number of remaining slots=number of remaining slots−amount of unallocated data) is satisfied. At step S17, it is determined whether or not the number of remaining slots is 0. When the number of remaining slots is 0, the allocating process is completed. When the number of remaining slots is not 0, like the case that there are no unallocated data, the flow advances to step S10. At step S10, all the flags are turned off.

FIG. 15 shows the allocating process after step S10 as the second part of the flow chart shown in FIG. 14. At step S18 shown in FIG. 15, the next MAC-ID is read. At step S19, it is determined whether or not the flag has been turned on. When the flag has been turned on, the process is completed. When the flag has not been turned on, the flow advances to step S20. At step S20, it is determined whether or not the amount of data is 0. When the amount of data is 0, the flow advances to step S21. At step S21, the flag is turned on. Thereafter, the flow returns to step S18 (where the next MAC-ID is read).

When the amount of data is 1 or greater, the flow advances to step S22. At step S22, all the flags are turned off. Thereafter, the flow advances to step S23. At step S23, determination is performed. At step S23, (priority, data whose amount is smaller than other data) (hereinafter this data are referred to as the amount of smaller data) is compared with (the number of remaining slots). The allocating process is varied depending on the case of (number of remaining slots>amount of smaller data), the case of (number of remaining slots=amount of smaller data), and the case of (number of remaining slots<amount of smaller data).

In the case of (number of remaining slots>amount of smaller data), the flow advances to step S24. At step S24, a slot is allocated. At step S25, the amount of data is decremented. At step S26, it is determined whether or not the amount of data is 0. When the amount of data is not 0, the flow advances to step S27. At step S27, the relation of (number of remaining slots=number of remaining slots−amount of smaller data) is satisfied. Thereafter, the flow returns to step S18 (where the next MAC-ID is read). When the amount of data is 0, the flow advances to step S28. At step S28, the flag is turned on. Thereafter, the flow advances to step S27.

In the case of (number of remaining slots=amount of smaller data), the flow advances to step S29. At step S29, a slot is allocated. At step S30, the amount of data is decremented. At step S31, the current MAC-ID and the current amount of data (0) are stored. Then, the process is completed.

In the case of (number of remaining slots<amount of smaller data), the flow advances to step S32. At step S32, the amount of allocatable data is allocated. At step S33, the amount of data is decremented. At step S34, the current MAC-ID and the current amount of unallocated data are stored. Then, the process is completed.

Next, a slot allocating process for a frame of the uplink channel will be described. Like the slot allocating process for a frame of the downlink channel, the slot allocation process for a frame of the uplink channel is performed in accordance with for example the round robin method. Alternatively, the slot allocating process for a frame of the uplink channel may be performed in accordance with the FIFO method (shown in FIG. 6) or the modified FIFO method (shown in FIG. 8) may be used.

For a frame of the uplink channel, slots of MDS and ACTS are allocated. With respect to the ACTS, one slot is allocated at the beginning of one TDMA frame. With respect to the MDS, a slot is forcedly allocated for the ACK against data of the downlink channel and a slot for regular data of the uplink channel. However, for data of the uplink channel, the ACK can be transmitted with the field of ACK sequence number of the MDP. For the ACK against data of the downlink channel, regular data of the uplink channel can be transmitted with the field of payload.

A slot allocated for the ACK against data of the downlink channel has higher priority than a slot allocated for regular data of the uplink channel.

Higher priority: MDS for the ACK against data of the downlink channel Lower priority: MDS for data of the uplink channel When the two bits that represents the last fragment of the upper layer PDU of the control field of the MDP is 1 (valid), a slot is always allocated for the ACK against data of the downlink channel.

Like the slot allocating process for a frame of the downlink channel, when the MDS is allocated for data of the uplink channel, the slot allocation control table (shown in FIG. 13A) is referenced. Slots are equally allocated to mobile stations that have been connected to the base station in accordance with the round robin method. The number of slots to be allocated in accordance with the round robin method is varied depending on the connection priority level. One slot is required to be allocated to a mobile station whose uplink transmission buffer status is 0 (namely, no data are stored in the transmission buffer). In this case, one slot is allocated in one TDMA frame.

When the slot management table is as shown in FIG. 13A, if there is no ACK against data of downlink channel to be transmitted, for a frame of the uplink channel, slots are allocated as shown in FIG. 16. The first data slot excluding the ACTS of one frame is allocated for the mobile station (A). Next, a slot is allocated for the mobile station (B). Since connection priority of the mobile station (C) is "2," two slots are allocated for the mobile station "C." Thereafter, slots are successively allocated for these mobile stations. The next slot allocating process in accordance with the round robin method starts with the mobile station "C." When a mobile station for which a slot has been allocated does not transmit valid data, no slot is allocated therefor in the designated TDMA period. When the mobile station transmits valid data, a slot is allocated for the mobile station in accordance with the regular round robin method.

Figure 17A:
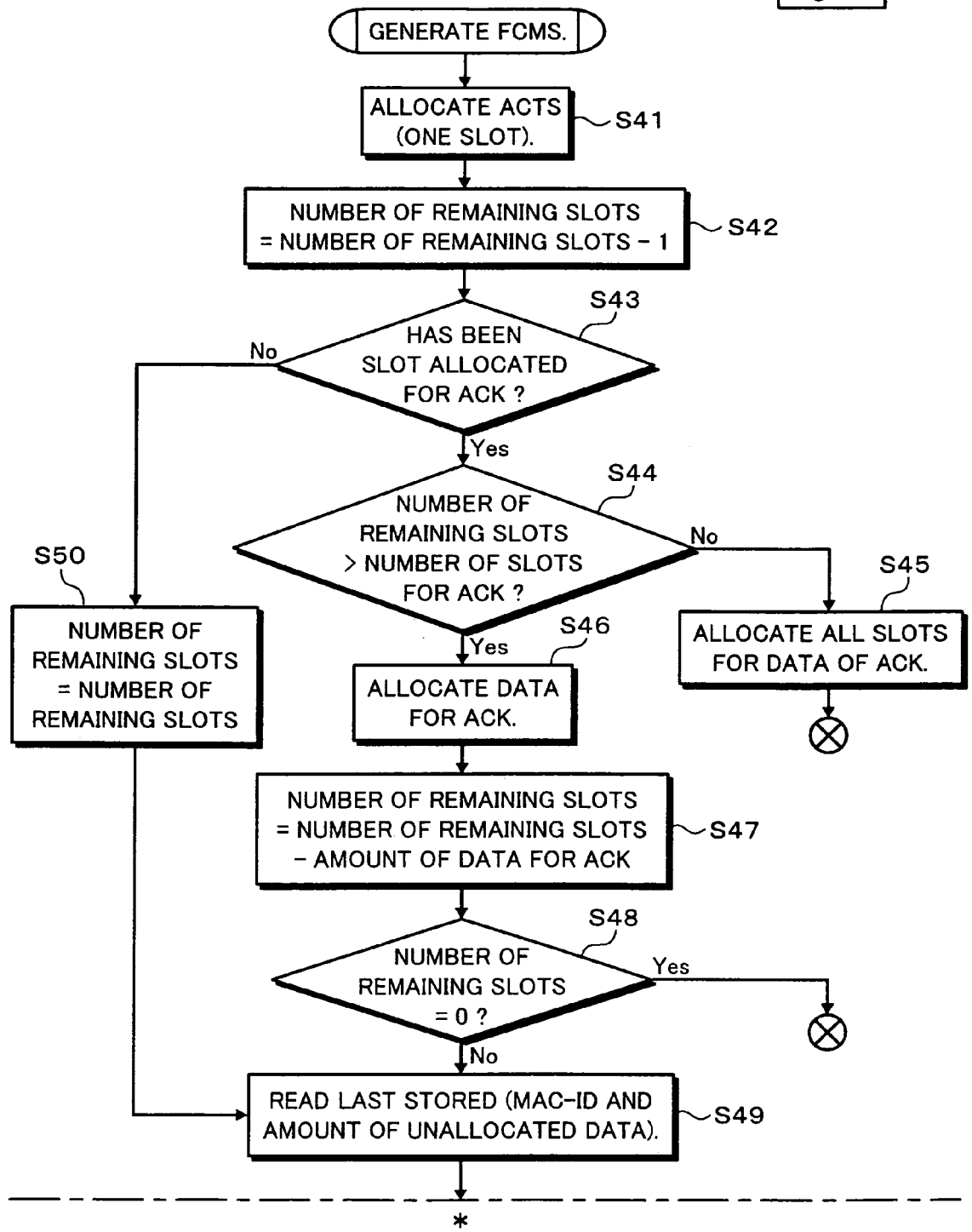
FIGS. 17A and 17B illustrate a first part of a flow chart describing an operation of a slot allocating process of a frame of the uplink channel.
Figure 17B:
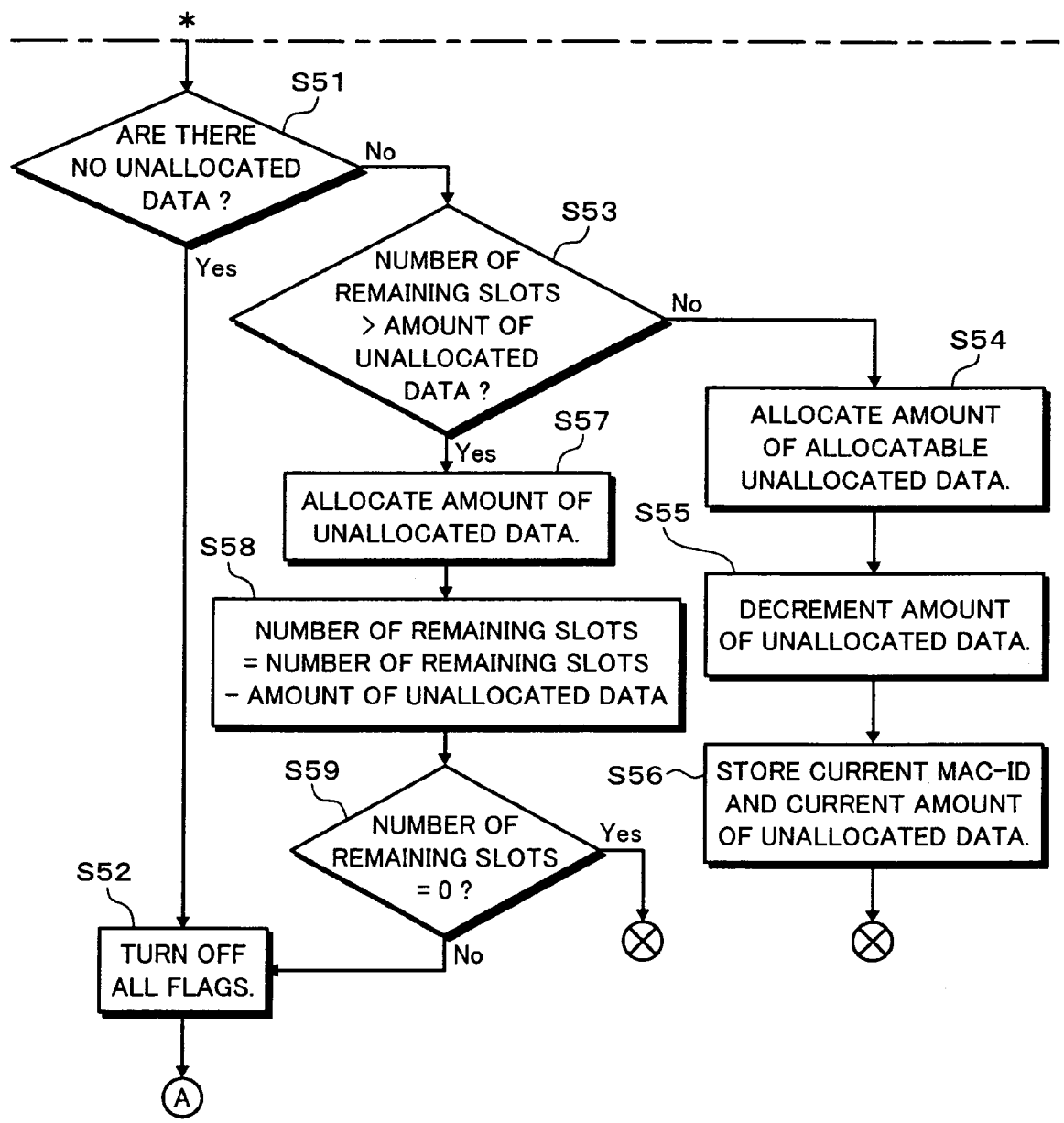
Figure 18A:
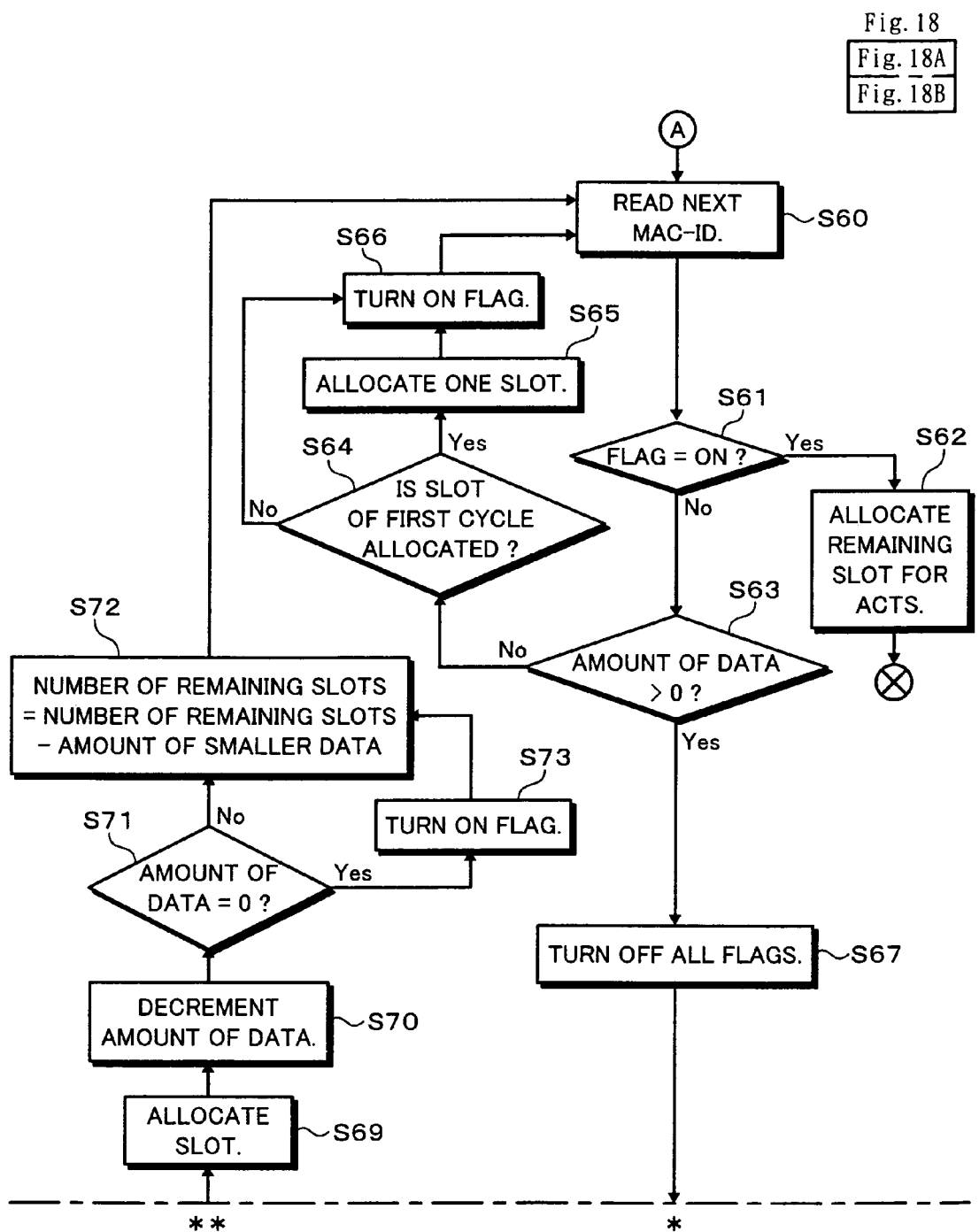
FIGS. 18A and 18B illustrate a second part of the flow chart shown in FIG. 17.
Figure 18B:
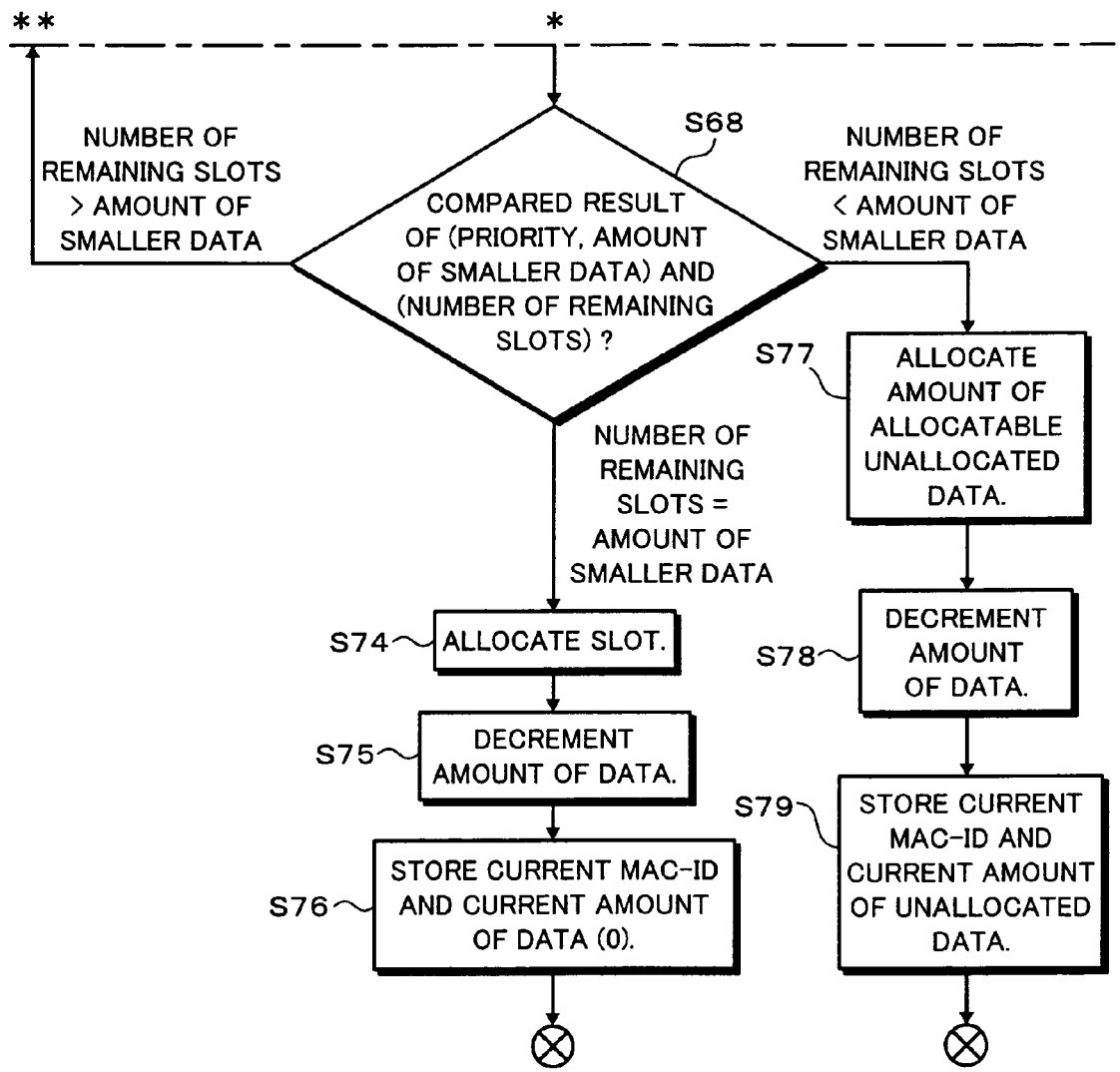

FIG. 17 and FIG. 18 are a flow chart showing a slot allocating process for a frame of the uplink channel, namely a process for generating the FCMS. Although these drawings show a sequence of one process, due to the restricted drawing space, the flow chart is drawn as two parts shown in FIG. 17 and FIG. 18.

At step S41, one slot at the beginning of one TDMA frame is allocated for the ACTS. The number of remaining slots is decremented by 1 (at step S42). At step S43, it is determined whether or not a slot has been allocated for the ACK. When a slot is required to be allocated for the ACK, a slot is allocated for the ACK with higher priority than a slot for other data. At step S44, the number of remaining slots (the number of remaining blank slots of one TDMA frame) is compared with the number of slots for the ACK. When the number of slots for the ACK is greater than the number of remaining slots, all slots are allocated for the ACK (at step S45). Then, the process is completed.

When the determined result at step S44 represents that the number of remaining slots is greater than the number of slots for the ACK, data for the ACK are allocated for a remaining slot (at step S46). Thus, at step S47, the relation of (number of remaining slots=number of remaining slots–amount of data of ACK) is satisfied. At step S48, it is determined whether or not the number of remaining slots is 0. When the number of remaining slots is 0, the allocating process is completed.

When the determined result at step S48 represents that there is a remaining slot, the flow advances to step S49. At step S49, the last stored (MAC-ID and amount of unallocated data) are read. When the determined result at step S43 represents that a slot has not been allocated for the ACK, the number of remaining slots is not changed (at step S50). Thereafter, the flow advances to step S49.

At step S51, it is determined whether or not there are unallocated data. When the determined result at step S51 represents that there are no unallocated data, the flow advances to step S52. At step S52, all the flags are turned off. When the determined result at step S51 represents that there are unallocated data, the flow advances to step S53. At step S53, the number of remaining slots is compared with the amount of unallocated data. When the amount of unallocated data is greater than the number of remaining slots, an allocatable slot is allocated for unassigned data (at step S54). The amount of allocated data is subtracted from the amount of unallocated data (at step S55). At step S56, the current MAC-ID and the current amount of unallocated data are stored. Then, the process is completed.

When the determined result at step S53 represents that the amount of unallocated data is smaller than the number of remaining slots, a remaining slot is allocated for the unallocated data (at step S57). Thus, at step S58, the relation of (number of remaining slots=number of remaining slots–amount of unallocated data) is satisfied. At step S59, it is determined whether or not the number of remaining slots is 0. When the number of remaining slots is 0, the allocating process is completed. When the number of remaining slot is not 0, like the case of which there are no unallocated data, the flow advances to step S52. At step S52, all the flags are turned off.

FIG. 18 shows the allocating process after step S52 as the second part of the flow chart shown in FIG. 17. At step S60 shown in FIG. 18, the next MAC-ID is read. At step S61, it is determined whether or not the flag has been turned on. When the flag has been turned on, the process is completed. Alternatively, before the process is completed, at step S62, a remaining slot may be allocated for the ACTS.

When the flag has not been turned on, the flow advances to step S63. At step S63, it is determined whether or not the amount of data is 0. When the amount of data is 0, the flow advances to step S64. At step S64, it is determined whether or not a slot of the first cycle is allocated. When a slot of the first cycle is allocated, the flow advances to step S65. At step S65, one slot is allocated. At step S66, the flag is turned on. Thereafter, the flow returns to step S60 (where the next MAC-ID is read). When the determined result at step S64 represents that a slot of the first cycle is allocated, the step for allocating one slot is skipped (at step S65). Thereafter, the flow advances to step S66 (where the flag is turned on).

When the amount of data is 1 or greater, the flow advances to step S67. At step S67, all the flags are turned off. At step S68, determination is performed. At step S68, (priority, data whose amount is smaller than other data) (hereinafter this data are referred to as the amount of smaller data) is compared with (the number of remaining slots). The allocating process is varied depending on the case of (number of remaining slots>amount of smaller data), the case of (number of remaining slots=amount of smaller data), and the case of (number of remaining slots<amount of smaller data).

In the case of (number of remaining slots>amount of smaller data), the flow advances to step S69. At step S69, a slot is allocated. At step S70, the amount of data is decremented. At step S71, it is determined whether or not the amount of data is 0. When the amount of data is not 0, the flow advances to step S72. At step S72, the relation of (number of remaining slots=number of remaining slots–amount of smaller data) is satisfied. Thereafter, the flow returns to step S60 (where the next MAC-ID is read). When the amount of data is 0, the flow advances to step S73. At step S73, the flag is turned on. Thereafter, the flow advances to step S72.

In the case of (number of remaining slots=amount of smaller data), the flow advances to step S74. At step S74, a slot is allocated. At step S75, the amount of data is decremented. At step S76, the current MAC-ID and the current amount of data (0) are stored. Then, the process is completed.

In the case of (number of remaining slots<amount of smaller data), the flow advances to step S77. At step S77, the amount of allocatable data is allocated. At step S78, the amount of data is decremented. At step S79, the current MAC-ID and the current amount of unallocated data are stored. Then, the process is completed.

Next, the re-transmission controlling system according to the protocol of the present invention will be described. In this example, as the re-transmission controlling system, Go-Back-N (GBN) system is used. In the GBN system, while the ACK or NACK is being returned, a subsequent packet is transmitted. When the ACK or NACK has been returned, it is determined whether or not to transmit a subsequent packet. However, the following data (packet) is not re-transmitted.

MDP: Broadcast data (destination MAC address: 0x11111111)→Neither user data, nor call control data are re-transmitted.

MDP: Data of only ACK—NACK information of uplink channel (control: 0x0*1*)→Valid data is not contained.

The data transmission side performs the re-transmission control in accordance with the regular GBN system. The transmission side keeps transmission data in the transmission buffer until the transmission side receives the ACK from the data reception side. For the ACK against data of the uplink channel, the field of ACK sequence number of the FCMS is used. For the ACK against data of the downlink channel, the field of ACK sequence number of the MDS is used. When the ACK is received, data older than the ACK sequence number are deleted from the buffer. Then, the regular data transmission is continued. When the NACK is received, data older than the NACK sequence number are deleted from the buffer. Then, data (packets) are re-transmitted after the subsequent data number. The re-transmitting process is triggered when one of the following events takes place.

(1) The NACK has been received (data error).

Data older than the NACK sequence number are deleted from the transmission buffer. Then, data are re-transmitted after the next sequence number.

(2) The ACK is redundantly received (the communication quality of the data transmission link has deteriorated).

If the ACK having the same sequence number has been received a plurality of times, data stored in the buffer are successively re-transmitted. The number of times the ACK is redundantly received can be statically set (from the outside).

(3) The ACK has not been returned (the communication quality for the transmission of the ACK has deteriorated).

If a timeout has occurred before the ACK has been returned, data stored in the buffer are successively re-transmitted. The timeout value can be statically set (form the outside).

The data reception side performs the regular re-transmitting control in accordance with the GBN system. The reception side discards all data that have been received after a data (packet) error has been detected. The sequence number of data that have been normally received is set to the field of ACK sequence number. For the downlink channel, the first bit of the field of control is set to valid (1b). The second bit of the field of control is set to NACK (0b). For the uplink channel, the third bit of the field of control is set to valid (1b). The fourth bit of the field of control is set to NACK (0b). For the downlink channel, the ACK is transmitted with the FCMP. For the uplink channel, the ACK is transmitted with the MDP. The ACK and NACK are retuned at the following timings.

(1) For the downlink channel (ACK or NACK against data of the uplink channel), immediately before the FCMS is transmitted, the ACK is returned with the FCMP against the MDP that has been normally received. The first bit of the field of control is set to "1" (valid). The second bit of the field of control is set to "1" (ACK). The current data number is set to ACK sequence number. When a data error has been detected, the first bit of the field of control is set to "1" (valid). The second bit of the field of control is set to "0" (NACK). The data number of data that have been normally received is set to ACK sequence number.

(2) For the uplink channel (ACK or NACK against data of the downlink channel), slot position information of the MDS for a frame of uplink channel contained in the FCMS is referenced. The ACK is returned against the MDP that has been normally received with the MDP. The third bit of the field of control is set to "1" (valid). The fourth bit of the field of control is set to "1" (ACK). The current data number is set to ACK sequence number. When a data error has been detected, the third bit of the field of control is set to "1" (valid). The fourth bit of the field of control is set to "0" (NACK). The data number of data that have been normally received is set to ACK sequence number.

Figure 19:
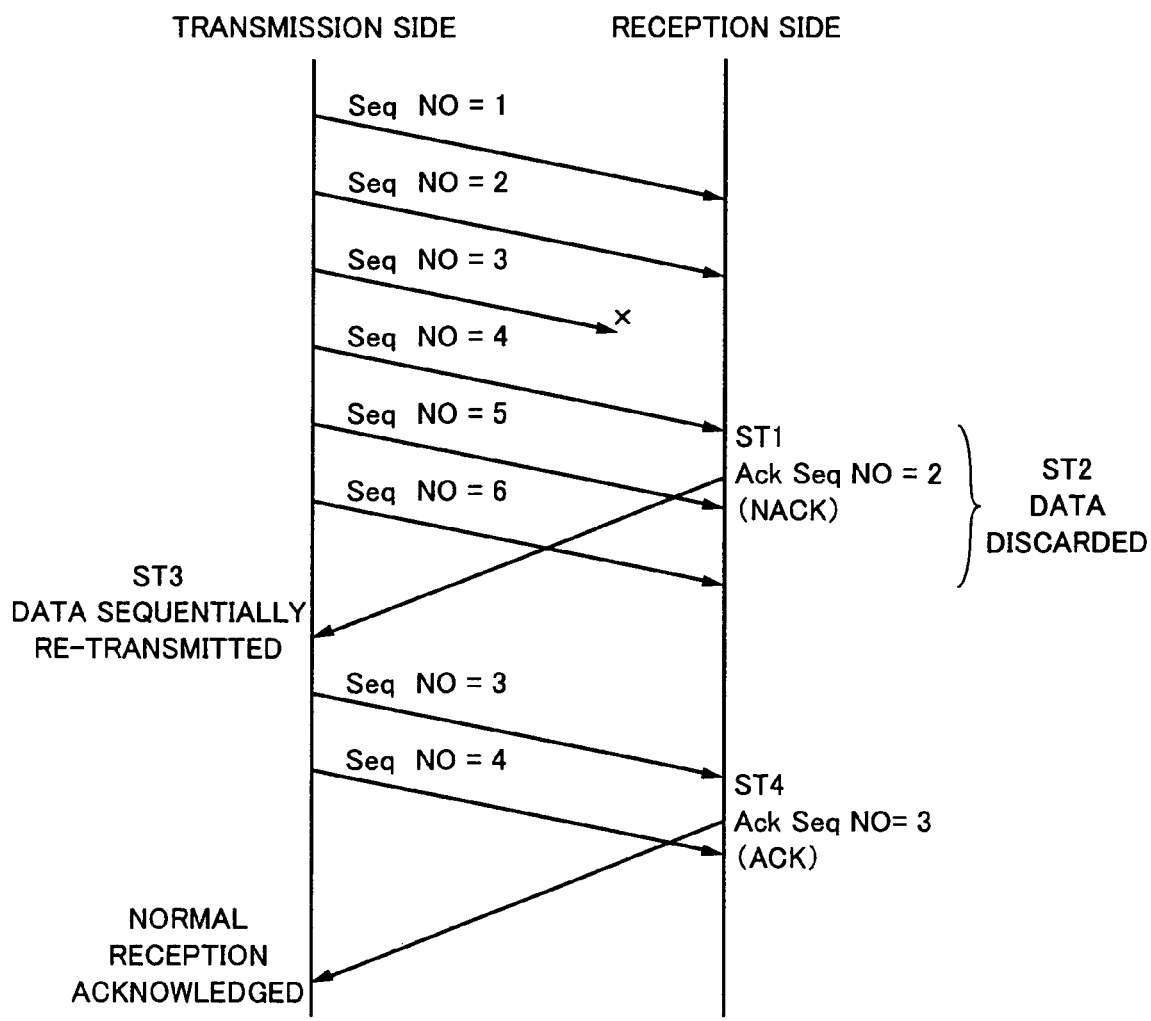
FIG. 19 is a schematic diagram describing an example of an operation of a re-transmitting process.

FIG. 19 shows an example of the re-transmission controlling process. In FIG. 19, it is assumed that data of sequence number=1 and data of sequence number=2 have been normally transmitted and received and an error has taken place in data of sequence number=3. At step ST1, the reception side has received data of sequence number "2" and then data of sequence number "4". Thus, the reception side detects an error of data of sequence number "3" and transmits the NACK that represents sequence number "2" as data that have been normally received. A data error is detected when data of unexpected sequence number is received. At step ST2, the reception side discards data of sequence numbers "4," "5," and "6" that have been received after the data error had been detected.

As a cause of a data error, a data (packet) loss, an error of the base band portion, a header CRC error, a payload error, or the like can be considered.

When the transmission side has received the NACK, the flow advances to step ST3. At step ST3, the transmission side deletes data of sequence numbers "1" and "2" that have been normally received on the reception side from the transmission buffer and successively retransmits data of sequence number "3" and later.

At step ST4, the reception side transmits the ACK that represents sequence number "3" against re-transmitted data to the transmission side.

Next, the re-transmission control against a collision of packets will be described. Since the ACTS of a frame of the uplink channel is a random access slot, there is a possibility of occurrence of a collision of packets because a plurality of mobile stations may transmit the ACTS at the same time. If the base band processing portion cannot recognize a frame when the mobile station receives data or if packets collide in the payload portion when the mobile station recognizes data as a frame, an error takes place in the base band processing portion.

When the mobile station is notified of the error, the mobile station sets the value of the field of collision detection of the FCMS that is subsequently transmitted to "1" (occurrence of collision). The mobile station references the field of collision detection of the FCMS. When a collision has taken place in the ACTP that the mobile station has transmitted, it determines a cycle and a sub slot of the ACTS with which that ACTP is transmitted using the random function and transmits the ACTP in accordance with the determined result.

Next, the accessing process for the uplink channel performed on the mobile station side will be described. When the mobile station receives a transmission request for call control data, the mobile station references the field of position information of the ACTS contained in the FCMP and transmits the call control data with the ACTS. Although the ACTS is divided into a plurality of sub slots, a sub slot with which the ACTP is placed is determined using the random function so as to decrease the probability of which a collision takes place. When a collision of the ACTP with another mobile station takes place, the base station sets collision information to the field of collision detection of the FCMS. The mobile station references the information and re-transmits the ACTP to the reception side. When the upper layer LLC generates a transmission request for user data, the mobile station references the position of the MDS contained in the FCMS and transmits the MDP with the MDS.

Next, the process that each mobile station performs when it enters the service area will be described. The mobile station stores the value of the field of base station ID of the FCMP. The field of base station ID of the FCMP represents a unique number (for example, an Ethernet address) that uniquely identifies the base station. When the mobile station enters the service area first time, the mobile station has not stored a base station ID. When the mobile station enters a different service area of another base station, the mobile station receives a base station ID of this base station, the base station ID being different from the base station ID that the mobile station has stored. When the mobile station receives the base station ID, the mobile station notifies the LLC of the received base station ID.

As described above, in the re-transmitting process shown in FIG. 19, a response signal is sent back every sequence. Thus, data is re-transmitted every sequence (this method is called the first method). In the first method, when data packets with sequence numbers have been normally transmitted, the data packets with these sequence numbers are treated as valid data packets. When data packets with sequence numbers have not been normally transmitted, the data packets with these sequence numbers are re-transmitted. As another re-transmitting method, when data packets with sequence numbers have not been normally transmitted, all the data packets including those that have been normally transmitted are discarded. The data packets are re-transmitted from the beginning (this method is called the second method). In the second method, it is not necessary to distinguish data packets that have been normally transmitted from data packets that are re-transmitted. In the second method, to perform the re-transmitting process, the terminal side (each mobile station) does not need to store data packets in the buffer. Thus, the scale of the buffer on the terminal side can be decreased. In addition, the process performed on the terminal side becomes simple.

It is preferred that the base station can select one of the two re-transmitting methods. For example, the base station can select the first method, of which only data packets that have not been normally transmitted in each sequence are re-transmitted, and the second method, of which all data packets including those that have been correctly transmitted are re-transmitted from the beginning of each sequence. The base station can select the first method or the second method depending on the capacity of the buffer of each mobile station side. The re-transmitting method that the base station has selected is described as identification data in the FCMP.

The communicating system disclosed in Patent Document 1 has been described in brief. Next, a communicating system according to the present invention will be described in brief. The communicating system according to the present invention is a communicating system of which the communication system disclosed in Patent Document 1 is modified so as to accomplish a more effective radio communication than the conventional communicating system.

FIG. 20A, FIG. 20B, and FIG. 20C show examples of the arrangements of slots of TDMA frames of the uplink channel. FIG. 20A shows the arrangement of slots described in Patent Document 1. Allocated at the beginning of a TDMA frame is one ACTS followed by seven MDSs. This example shows that one ACTS is one slot. However, one ACTS may have a plurality of (for example four) mini slots (or sub slots). The mobile station side can randomly select one from these mini slots and use the selected mini slot.

The mobile station side transmits registration—deregistration request, connection setup—connection release request, and so forth to the base station, using a mini slot of the ACTS. On the other hand, an MDS is used to transmit (upload) data from the mobile station side to the base station. In addition, an MDS can be used to transmit an upload request, a download request, user data, and ACK information against data transmitted through the downlink channel from the mobile station side to the base station.

FIG. 20B and FIG. 20C show examples of TDMA frames of the uplink channel according to the present invention. FIG. 20B shows a TDMA frame that is composed of only eight MDSs, no ACTS. When the free space of the transmission buffer of the base station decreases, it changes the contents of the FCMP that is transmitted to the mobile station side so that ACTSs are not allocated to a TDMA frame of the uplink channel. As a result, registration and connection setup of mobile stations are prohibited. The slots of the TDMA frame are used for data downloaded to the mobile station side that has been connected to the base station. Thus, the free space of the transmission buffer of the base station can be increased.

When the base station changes the arrangement of a TDMA frame as shown in FIG. 20B, the base station can prevent the transmission buffer from overflowing.

FIG. 20C shows the arrangement of a TDMA frame composed of only ACTSs in contrast to the TDMA frame shown in FIG. 20B. When many users simultaneously try to use their radio terminal units in for example a large convention hall, the base station changes the contents of the FCMP that the base station transmits to the mobile station side so that a TDMA frame of the uplink channel is composed of only ACTSs. Thus, registrations and connection setups of new mobile stations can be smoothly performed. As a result, the possibility of which much data are written to the transmission buffer of the base station increases. When the use rate of the transmission buffer has reached a predetermined ratio, the base station can decrease the number of ACTSs of a TDMA frame. On the other hand, when TDMA frames each of which is composed of only ACTSs have been used for a long time, data to be uploaded reside in the mobile station side. Thus, it is preferred that the base station should decrease the number of ACTSs of a TDMA frame at predetermined timing or at intervals of a predetermined period.

The TDMA frames shown in FIG. 20B and FIG. 20C are extreme cases of the arrangement of ACTSs. The base station according to the present invention can optimally decide the number of ACTSs corresponding to the use rate of the transmission buffer and dynamically change the number of ACTSs. In addition, it is not necessary to allocate ACTSs from the beginning of a TDMA frame. For example, ACTSs may be allocated to the first and fifth slots of a TDMA frame.

Figure 21:
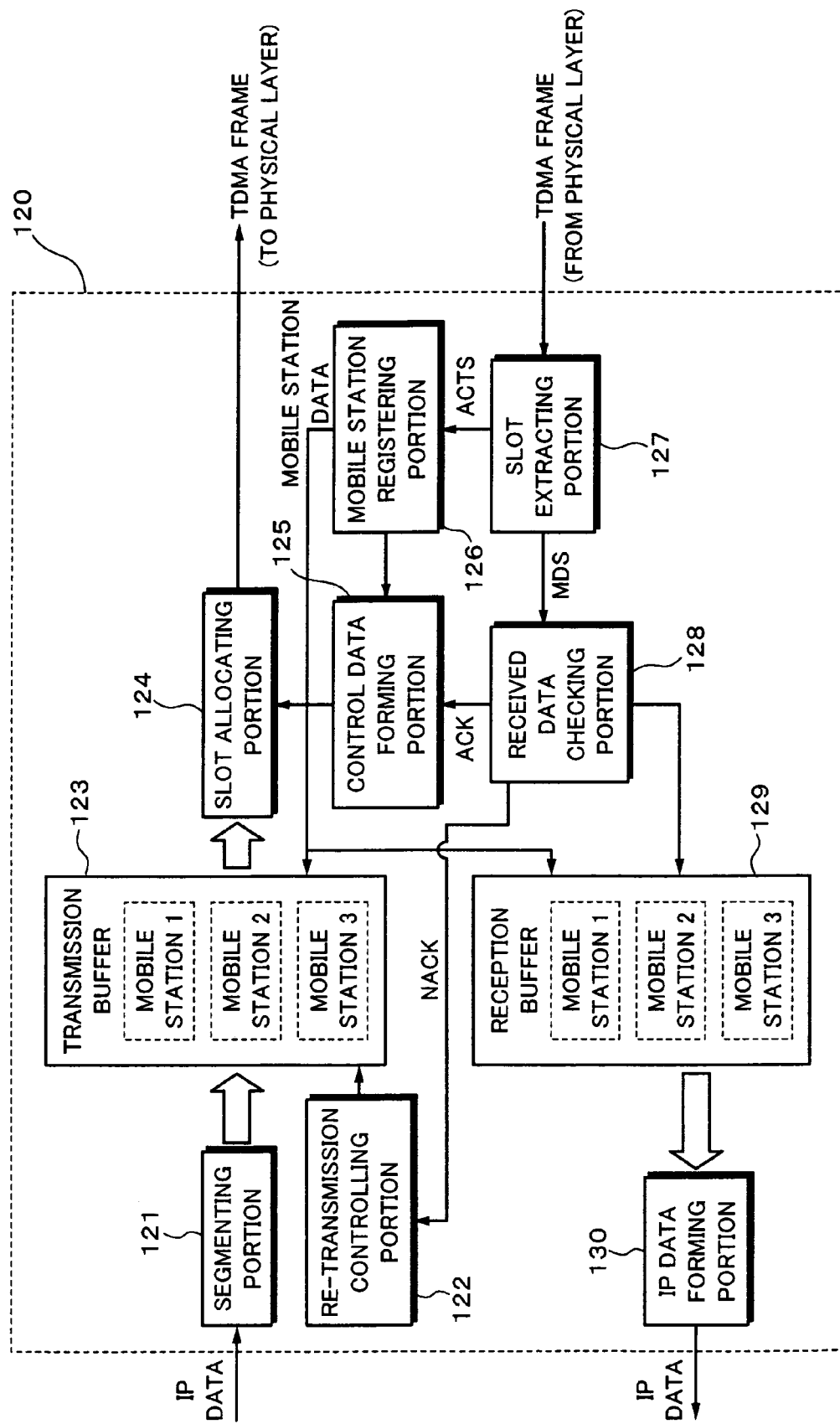
FIG. 21 is a block diagram showing transmitting and receiving functions of the base station according to the embodiment of the present invention.

Next, with reference to a block diagram shown in FIG. 21, transmitting and receiving functions of a MAC layer of the base station according to the embodiment of the present invention will be mainly described. A transmitting and receiving portion 120 of the base station comprises a segmenting portion 121, a re-transmission controlling portion 122, a transmission buffer 123, a slot allocating portion 124, a control data forming portion 125, a mobile station registering portion 126, a slot extracting portion 127, a received data checking portion 128, a reception buffer 129, and an IP data forming portion 130. The transmitting and receiving portion 120 corresponds to the functions of the MDP generating portion 3, the FCMP generating portion 4, and the received packet determining portion 10 shown in FIG. 1.

The segmenting portion 121 segments IP data to be transmitted in a predetermined length corresponding to the length of a slot and stores the segmented data in the transmission buffer 123. The transmission buffer 123 is managed for each registered mobile station. The segmenting portion 121 stores the segmented IP data in corresponding areas of the transmission buffer 123 in accordance with the mobile stations as the recipients. Thereafter, the slot allocating portion 124 generates data of each MDS with the IP data stored in the transmission buffer 123 and forms a TDMA frame with the data (MDP) of each MDS and the data (FCMP) of FCMS generated by the control data forming portion 125. Slots are allocated in accordance with one of the foregoing methods.

When the slot extracting portion 127 receives a TDMA frame from each of the mobile stations, the slot extracting portion 127 sends ACTSs and MDSs to the mobile station registering portion 126 and the received data checking portion 128, respectively. The received data checking portion 128 determines the contents of the MDS. When the contents of the MDS are ACK against data of the downlink channel, the received data checking portion 128 sends the determined result to the control data forming portion 125. When the contents of the MDS are NACK against data of the downlink channel, the received data checking portion 128 causes the re-transmission controlling portion 122 to re-transmit data of the downlink channel. When the contents of the MDS are data of the uplink channel, the data having been transmitted from a mobile station, the received data checking portion 128 stores the data in a region corresponding to the mobile station of the reception buffer 129. The IP data forming portion 130 forms the data as IP data and sends it to the upper layer.

When the received ACTS contains a registration request, the mobile station registering portion 126 allocates areas for the mobile station to the transmission buffer 123 and the reception buffer 129. When the received ACTS contains a deregistration request, the mobile station registering portion 126 deletes the allocated areas for the mobile station from the transmission buffer 123 and the reception buffer 129. When the received ACTS contains a download request or an upload request, the mobile station registering portion 126 causes the control data forming portion 125 to generate a necessary FCMP. When the ACTS contains a download request, the mobile station registering portion 126 extracts download data from the transmission buffer 123 and transmits the download data to the slot allocating portion 124.

In addition, when the received ACTS contains a connection setup request from a mobile station, the mobile station registering portion 126 adds the mobile station to the slot allocation management table shown in FIG. 13A and allocates a connection setup MAC address to the mobile station. Thereafter, when the base station receives IP data for the mobile station as the recipient, the segmenting portion 121 increments the down link transmission buffer status for the mobile station in the slot allocation management table by 1.

When the control data forming portion 125 generates FCMPs, it decides the number of ACTSs and the arrangement thereof and sets them to uplink slot allocation information. The uplink slot allocation information contains allocation slot types of every eight slots. In the slot allocation information, an ACTS is denoted by as (10b) and an MDS by (01b). Uplink ACK information contains a result of which a registration request or a connection setup request from a mobile station has failed due to collision with a request that another mobile station has transmitted with the same slot (this result is referred to as collision detection).

The control data forming portion 125 performs a process for deciding the number of ACTSs and their arrangement. Next, with reference to a flow chart shown in FIG. 22, the process will be described. When the control data forming portion 125 transmits a new TDMA frame to the mobile station side (for example, when data to be transmitted is supplied from the transmission buffer 123 to the slot allocating portion 124 or when ACK data is received from the received data checking portion 128, the control data forming portion 125 generates the FCMP. At this point, the control data forming portion 125 starts the process shown in the flow chart of FIG. 22.

At step S101, the control data forming portion 125 obtains the contents of the slot allocation management table and checks the statuses of individual mobile stations in the downlink transmission buffer. Since the slot allocation management table describes the amount of data for each mobile station stored in the downlink transmission buffer, by summing all the data amounts of data described in the slot allocation management table, the use rate U of the transmission buffer can be obtained. In this example, by obtaining the contents of the slot allocation management table, the use rate of the transmission buffer is estimated. Alternatively, by directly accessing the transmission buffer of the base station, the use rate can be obtained. In this example, the use rate means the ratio of data that occupy the transmission buffer. Thus, 1−U represents the free space of the transmission buffer.

At step S102, the control data forming portion 125 determines the use rate U of the transmission buffer. When U is smaller than a predetermined threshold value $\alpha$, the flow advances to step S103. When U is equal to or larger than the threshold value $\alpha$ and smaller than another threshold value $\beta$ (where $\beta$ is larger than $\alpha$), the flow advances to step S105. When U is equal to or larger than the threshold value $\beta$, the flow advances to step S106.

When U is smaller than the threshold value $\alpha$, namely the use rate of the transmission buffer is relatively low and has an enough free space, at step S103, the control data forming portion 125 determines with what probability predetermined requests for which the base station is connected to the mobile station side, namely registration requests or connection setup requests that the mobile station side transmits are colliding. When the probability P is equal to or larger than a predetermined threshold value $\gamma$, the control data forming portion 125 decides that the number of ACTSs is eight (at step S104). Otherwise, the control data forming portion 125 decides that the number of ACTSs is one (at step S105). This decision deals with a situation of which there are so many note type personal computers and cellular phones in a large convention hall or the like and they try to simultaneously perform radio communications. When the probability of collision is equal to or larger than a predetermined threshold value, so many registration requests and so forth are occurring and the present ACTSs cannot deal with these requests. On the other hand, when the probability of collision is lower than the predetermined threshold value, the control data forming portion 125 determines that there are not so many registration requests and so forth. Thus, the control data forming portion 125 determines that since there are not so many requests, a normal ACTS (namely, one ACTS) can deal with them.

In this example, one ACTS contains four mini slots. In this case, one ACTS can deal with registration requests transmitted from four mobile stations.

When the determined result at step S102 represents that U is equal to or lager than the threshold value α and small than the threshold value β, the flow advances to step S105. At step S105, the control data forming portion 125 decides that the number of ACTSs is one. When the use rate of the transmission buffer is middle, since the transmission buffer still has a free space, the control data forming portion 125 decides that the number of ACTSs is one with which registration requests for new mobile stations are dealt. In this case, the control data forming portion 125 may determine the collision probability P. When the collision probability P is equal to or larger than a predetermined value, the control data forming portion 125 may increase the number of ACTSs.

When the determined result at step S102 represents that U is equal to or larger than the threshold value β, the flow advances to step S106. At step S106, the control data forming portion 125 decides that the number of ACTSs is 0. When the use rate of the transmission buffer is high, the control data forming portion 125 decreases the number of ACTSs so as to prohibit new mobile stations from being registered. As a result, the use rate of the transmission buffer is decreased.

When the control data forming portion 125 has decided the number of ACTSs, the flow advances to step S107. At step S107, the control data forming portion 125 generates an FCMP corresponding to the number of ACTSs and transmits data to each mobile station with an FCMS. The number of ACTSs affects the uplink slot allocation information in the FCMP. The slot allocation information describes slot types of eight slots. At step S107, the control data forming portion 125 allocates these slots corresponding to the decided number of ACTSs. When the number of ACTSs is one to seven, the control data forming portion 125 can designate the positions of the ACTSs in a TDMA frame. The control data forming portion 125 can designate positions of ACTSs corresponding to a predetermined rule for example from the beginning.

Figure 22:
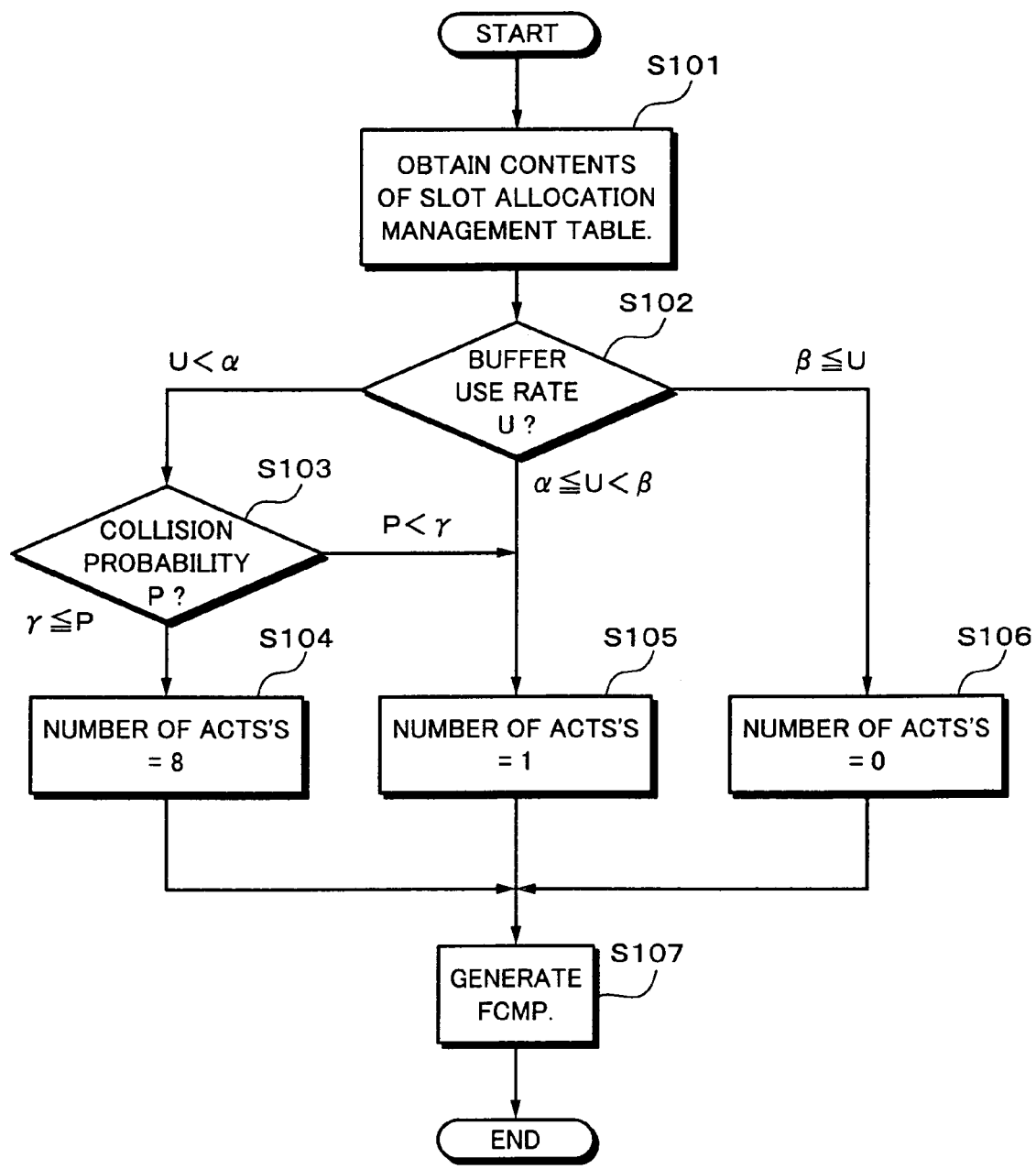
FIG. 22 is a flow chart showing a process for deciding the number of ACTSs.

In the example shown in FIG. 22, the control data forming portion 125 decides the number of ACTSs corresponding to the use rate of the transmission buffer and the collision probability of registration requests and so forth transmitted from mobile stations. Alternatively, the control data forming portion 125 may decide the number of ACTSs corresponding to one of the use rate of the transmission buffer and the collision probability of registration requests and so forth transmitted from mobile stations. Alternatively, the control data forming portion 125 may decide the number of ACTSs always corresponding to both these two factors. In this example, the control data forming portion 125 determines the use rate of the transmission buffer with the two threshold values. Alternatively, the control data forming portion 125 may decide the number of ACTSs with one or three or more threshold values.

Figure 23:
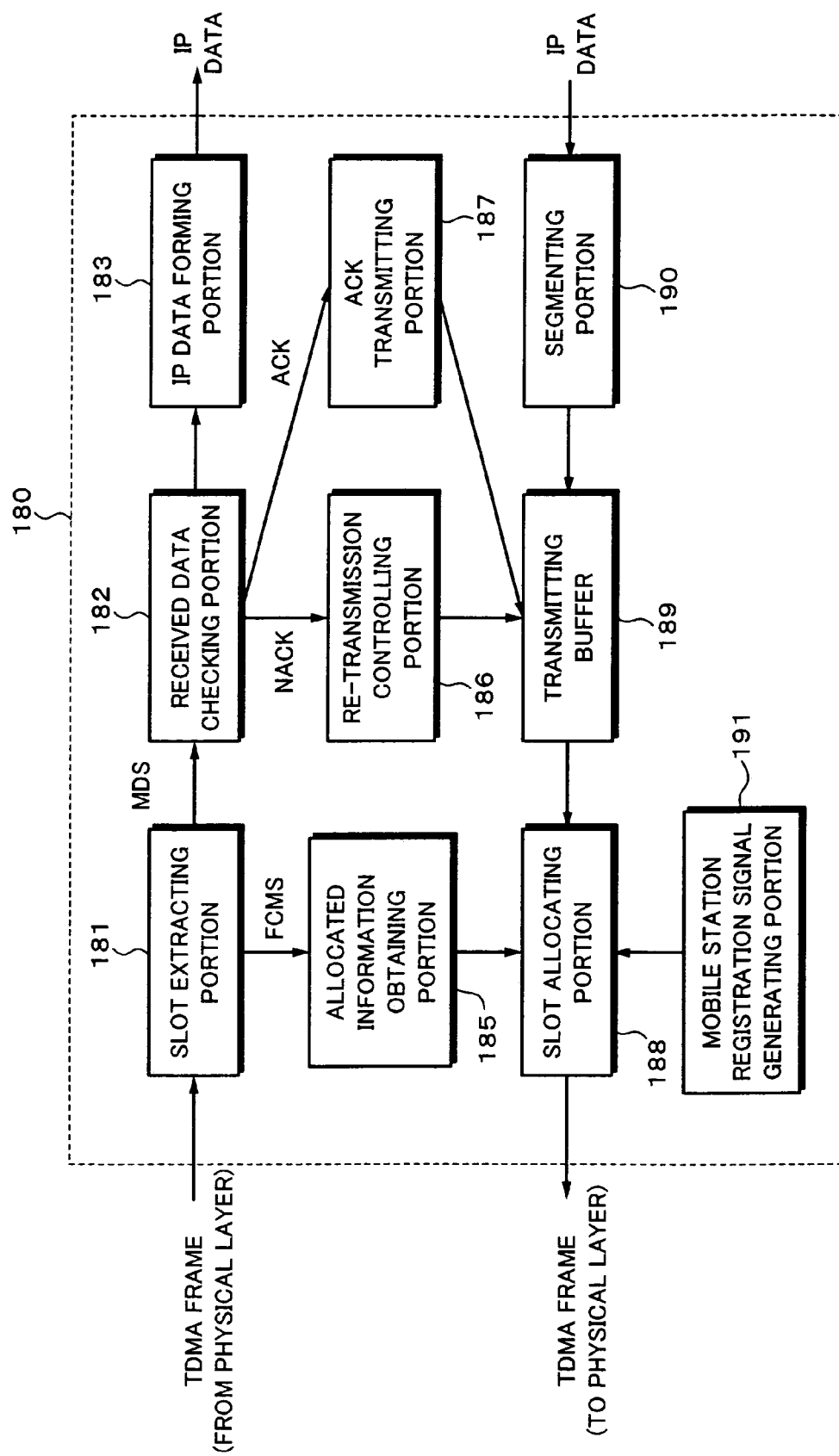
FIG. 23 is a block diagram showing transmitting and receiving functions of a mobile station according to the embodiment of the present invention.

Next, with reference to FIG. 23, transmitting and receiving functions of a mobile station according to the embodiment of the present invention will be described. FIG. 23 is a block diagram showing the transmitting and receiving functions mainly of the MAC layer. A transmitting and receiving portion 180 comprises a slot extracting portion 181, a received data checking portion 182, an IP data forming portion 183, an allocated information obtaining portion 185, a re-transmission controlling portion 186, an ACK transmitting portion 187, a slot allocating portion 188, a transmission buffer 189, a segmenting portion 190, and a mobile station registration signal generating portion 191. The transmitting and receiving portion 180 corresponds to the functions of the ACTP generating portion 23, the MDP generating portion 24, and the received packet determining portion 31 shown in FIG. 2.

The slot extracting portion 181 extracts an FCMS from a TDMA frame transmitted from the base station. The allocated information obtaining portion 185 determines the contents of the FCMP. With reference to the contents of the uplink slot allocation information, the allocated information obtaining portion 185 can determine the number of slots allocated to ACTSs by the base station and their positions in the TDMA frame. In addition, with reference to collision detection and so forth of ACK information against data of the uplink channel, the allocated information obtaining portion 185 determines whether or not the downlink and uplink channels are busy.

When the downlink channel or uplink channel is used, the slot allocating portion 188 sends a mobile station registration signal generated by the mobile station registration signal generating portion 191 (registration request) to the physical layer and transmits the registration request to the base station. The mobile station registration signal contains for example the MAC address of the mobile station.

The slot extracting portion 181 sends to the received data checking portion 182 the MDSs of the TDMA frame transmitted from the base station. The received data checking portion 182 determines whether or not the received data are normal. When the received data are normal, the ACK transmitting portion 187 transmits ACK to the base station. The IP data forming portion 183 generates the received data as IP data and supplies the IP data to the upper layer. When the received data are not normal, the re-transmission controlling portion 186 causes the base station to re-transmits the received data to the mobile station.

When the IP data are received from the upper layer, the segmenting portion 190 segments the IP data and sends the segmented IP data as the MDSs to the physical layer through the transmission buffer 189 and the slot allocating portion 188.

Each function of the base station and the mobile station side according to the present invention has been described. The operation of the MAC layer protocol is the same as that disclosed in Patent Document 1. However, the operation of the slot allocating process for the uplink channel should be performed in consideration of changes of the number of ACTSs and their positions.

Next, how data of a TDMA frame of the protocol of the present invention are transmitted and received in accordance with the OFDM system will be described. First of all, with reference to FIG. 24 and FIG. 25, the format of a TDMA frame transmitted in accordance with the OFDM system will be described. In FIG. 24 and FIG. 25, the vertical axis represents the frequency axis, whereas the horizontal axis represents the time axis. A plurality of for example (64× 12=768) sub carriers are set at predetermined intervals. A signal having a predetermined time width of a sub carrier is referred to as an OFDM symbol.

The TDMA frame shown in FIG. 24 is a TDMA frame 50 of the downlink channel. An OFDM sub carrier 51 transmitted from the base station to each mobile station is composed of for example 12 sub channels 52. Each sub channel 52 is segmented as blocks in a predetermined time length on the time axis. The segmented blocks of the sub channels 52 are referred to as slots. The foregoing FCMSs 53 and MDSs 54 are allocated to slots. In the example shown in FIG. 24, one sub channel 52 of one TDMA frame 50 contains one FCMS 53 and eight MDSs 54.

The total number of sub carriers of the OFDM sub carriers 51 is for example 768. The number of OFDM sub carriers of each sub channel 52 is 64. With the 64 sub carriers, the FCMP and MDPs of the protocol are transmitted. As shown in FIG. 9, one FCMS 53 is composed of a header portion 55 of 16 bytes and a payload portion 56 of 66 bytes (where two bytes are used for CRC (Cyclic Redundancy Check)). As shown in FIG. 11, one MDS 54 is composed of a header portion 57 of 12 bytes and a payload portion 58 of 130, 258, or 386 bytes (where two bytes are used for CRC).

The FCMS 53 corresponds to the FCMS shown in FIG. 4. The FCMS 53 is followed by the MDSs 54 of the same sub channel 52 (contained in one TDMA frame 50). The MDSs 54 correspond to the MDSs shown in FIG. 4A. The TDMA frame shown in FIG. 4A is not transmitted with all the OFDM sub carriers (namely, 768 sub carriers), but 64 sub carriers allocated for one sub channel 52.

FIG. 25 shows a TDMA frame 60 of the uplink channel. An OFDM sub carrier 61 is transmitted from each mobile station to the base station in accordance with the OFDM system. One OFDM sub carrier 61 is composed of 12 sub channels 62. Each of the sub channels 62 is segmented as blocks on the time axis. The segmented blocks of the sub channels 62 are referred to as slots. The slots are allocated for ACTSs 63 and MDSs 64. In the example shown in FIG. 25, one sub channel 62 of one TDMA frame 60 contains four ACTSs 63 and seven MDSs 64. In this example, although the four ACTSs 64 are allocated, the number of ACTs 64 is not limited to four. Instead, the number of ACTs 64 may be another fixed number.

The number of OFDM sub carriers of the sub carrier 61 is for example 768. The number of sub carriers of each sub channel 62 is 64. With the 64 sub carriers, the ATCSs 63 and MDSs 64 are transmitted. As shown in FIG. 12, one ACTS 63 is composed of a header portion 65 of six bytes and a payload portion 66 of 34 bytes (where two bytes are used for CRC). The structure of each of the MDSs 64 is the same as that of each of the MDSs 54 shown in FIG. 24.

Each of the ACTSs 63 correspond to the ACTS shown in FIG. 4A. The MDSs 64 adjacent to the ACTSs 63 of the same sub channel 62 (namely, slots of one TDMA frame 60) correspond to the MDSs shown in FIG. 4A.

The foregoing frames transmitted in accordance with the OFDM system accomplish a radio communicating system having 12 independent protocols. In other words, a plurality of sub channels (in this example, 12 sub channels) can be set between one base station and a plurality of mobile stations for radio communications. Thus, a slot allocation and a re-transmission control of the MAC layer protocol can be performed for each channel in parallel.

In the examples shown in FIG. 24 and FIG. 25, the numbers of sub channels 52 and 62 are 12 each. The number of MDSs 54 of a TDMA frame 50 of the downlink channel is 8. The number of MDSs of a TDMA frame 60 of the uplink channel is 7. However, it should be noted that they are just examples. Thus, they can be properly selected.

FIGS. 26A and 26B show an example of the characteristics of a TDMA frame. FIG. 26A shows common characteristics of the FCMS, MDS, and ACTS. As described above, the total number of OFDM sub carriers is 768. The number of sub channels is 12. The number of OFDM sub carriers of a sub channel is 64. The transmission time of one OFDM symbol is 8 µs. The guard interval length is 2 µs.

FIG. 26B shows an example of characteristics of the FCMS 53. The modulating system is binary phase shift keying (BPSK). As forward error correction (FEC), convolutional code is used. The number of preamble OFDM symbols transmitted in accordance with OFDM system is 3. The number of OFDM data symbols preceded by the preamble OFDM symbols is 21. Thus, one slot of one sub channel contains 24×64=1536 OFDM symbols. Two symbols of the preamble OFDM symbols are used for channel estimation. Since there are a total of 24 OFDM symbols, the transmission time of the FCMS is 24×10 µs=240 µs. OFDM data symbols are data interleaved (randomized) in either or both the chronological direction and the frequency direction and modulated in accordance with the BPSK system.

FIG. 27A shows an example of characteristics of the MDSs 54 and 64. The modulating system is quaternary phase shift keying (QPSK), quadrature amplitude modulation (16QAM), or sixty-four quadrature amplitude modulation (64QAM). Since the number of allocated bits varies depending on the modulating system, the number of payload bytes varies. As the FEC, convolutional code is used. The number of preamble OFDM symbols transmitted in accordance with the OFDM is 5. The number of OFDM data symbols preceded by the preamble OFDM symbols is 19. Thus, one slot of one sub channel contains 24×64=1536 OFDM symbols. Since there are a total of 24 OFDM symbols, the transmission time of the FCMS is 24×10 µs=240 µs. Two symbols of the preamble OFDM symbols are used for channel estimation. The OFDM data symbols are data interleaved (randomized) in either or both the chronological direction and the frequency direction and modulated.

FIG. 27B shows an example of characteristics of the ACTS. The modulating system is binary phase shifting keying (BPSK). As the FEC, convolutional code is used. The number of preamble OFDM symbols transmitted in accordance with the OFDM system is 2. The number of OFDM data symbols preceded by the preamble OFDM symbols is 10. Thus, one slot of one sub channel contains 12×64=768 OFDM symbols. Two symbols of the preamble OFDM symbols are used for channel estimation. Since there are a total of 12 OFDM symbols, the transmission time of the FCMS is 12×10 µs=120 µs. The OFDM data symbols are data interleaved (randomized) in either or both the chronological direction and the frequency direction and modulated. The transmission time of the ACTS is half that of the FCMS or MDS. As shown in FIG. 25, one TDMA frame of the uplink channel has four ACTSs and seven MDSs. As shown in FIG. 24, one TDMA frame of the downlink channel has one FCMS and eight MDSs. Thus, the chronological length of one TDMA frame of the uplink channel is the same as that of one TDMA frame of the downlink channel.

When data are OFDM transmitted according to the present invention, each mobile station does not always need to access all sub channels. The number of sub channels that each mobile station accesses can be decided depending on the device scale, power consumption, applicable fee, and so forth thereof. When a mobile station accesses all sub channels, the number of sub channels that the mobile station uses can be flexibly set with parameters and so forth depending on the power consumption of the device of the mobile station, the applicable fee, and so forth. In addition, the modulating system, and so forth of each slot can be set with parameters.

However, it is preferred that the reception side of each mobile station should receive all sub channels so as to effectively find a sub channel having a blank slot from all the sub channels. Each mobile station can receive all OFDM sub carriers from the base station through the downlink channel, receive FCMSs of all received sub carriers, receive information of all frames of the uplink and downlink channels allocated for the sub carriers, send a registration request with an ACTS of a frame of the uplink channel allocated for the required sub carrier, and transmit frames of the uplink and downlink channels allocated for a sub carrier that has been registered.

As countermeasures against interference of adjacent cells that have the same frequency, delay profile estimating and notifying method, adaptive modulation, and multi-level transmit power control (MTPC) proposed by T. Nakanishi et. al., Proc. WPMC '03, pp. V3-188-192, October 2003 can be used. In other words, when a base station and a mobile station transmit data, a modulating system and a transmission power can be selected for each slot of frames of the uplink and downlink channels. When the encoding rate for a code used in each slot is varied, a multi-rate system can be accomplished.

In the foregoing description, parties with which the base station communicates were referred to as "mobile stations." It should be noted that they mean devices with which the base station radio-communicates. Thus, devices that are permanently or temporarily fixed are not excluded from the scope of the present invention.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A communicating system having a base station and a mobile station that communicate with each other wirelessly and simultaneously using frames of an uplink channel and a downlink channel, each of the frames being composed of a plurality of chronologically divided slots,
   a frame control message slot (FCMS) and a message data slot (MDS) being allocated to each frame of the downlink channel,
   with the frame control message slot, slot allocation information of the uplink channel, slot allocation information of the downlink channel, response information against data transmitted through the uplink channel, response information against a connection setup—connection release request from the mobile station, and response information against a registration—deregistration request from the mobile station being transmitted from the base station to the mobile station,
   the uplink channel containing a message data slot (MDS) and an activation slot (ACTS), the activation slot being composed of a plurality of mini slots each of which has a length of one frame or smaller,
   with the activation slot, the connection setup connection release request and the registration—deregistration request received from the mobile station being transmitted from the mobile station to the base station,
   with the message data slot, response information against downlink data being transmitted to the base station,
   wherein the base station comprises:
   a transmission buffer that temporarily stores data to be transmitted to the mobile station through the downlink channel; and
   a control data forming portion that forms the frame control message slot,
   wherein when the control data forming portion sets up allocation information of the uplink channel including the number of activation slots of each frame of the uplink channel, if the use rate of the transmission buffer is larger than a predetermined value, the number of activation slots contained in each frame of the uplink channel is set to zero, if the use rate of the transmission buffer is not larger than the predetermined value, a collision probability is obtained according to detected collisions contained in the response information against the downlink data, if the collision probability is smaller than a predetermined value, the number of activation slots contained in each frame of the uplink channel is set to 1, and if the collision probability is larger than the predetermined value, the number of activation slots is increased to 2 or higher value.

2. A communicating method with a base station and a mobile station that communicate with each other wirelessly and simultaneously using frames of an uplink channel and a downlink channel, each of the frames being composed of a plurality of chronologically divided slots, the base station having a transmission buffer that temporarily stores data to be transmitted to the mobile station through the downlink channel and a control data forming portion that forms a frame control message slot (FCMS), the communicating method comprising of the steps of:
   allocating the frame control message slot and a message data slot (MDS) to each frame of the downlink channel;
   transmitting with the frame control message slot, slot allocation information of the uplink channel, slot allocation information of the downlink channel, response information against data transmitted through the uplink channel, response information against a connection setup—connection release request from the mobile station, and response information against a registration—deregistration request from the mobile station from the base station to the mobile station;
   causing the uplink channel to contain a message data slot (MDS) and an activation slot (ACTS), the activation slot being composed of a plurality of mini slots each of which has a length of one frame or smaller;
   transmitting with the activation slot, the connection setup—connection release request and the registration—deregistration request received from the mobile station from the mobile station to the base station;
   transmitting with the message data slot, response information against downlink data to the base station; and
   setting the control data forming portion allocation information of the uplink channel including the number of activation slots of each frame of the uplink channel such that if the use rate of the transmission buffer is larger than a predetermined value, the number of activation slots contained in each frame of the uplink channel is set to zero, if the use rate of the transmission buffer is not larger than the predetermined value, a collision probability is obtained according to detected collisions contained in the response information against the downlink data, if the collision probability is smaller than a predetermined value, the number of activation slots contained in each frame of the uplink channel is set to 1, and if the collision probability is larger than the predetermined value, the number of activation slots is increased to 2 or higher value.

3. A base station in a communicating system having a base station and a mobile station that communicate with each other wirelessly and simultaneously using frames of an uplink channel and downlink channel, each of the frames being composed of a plurality of chronologically divided slots, a frame control message slot (FCMS) and a message data slot (MDS) being allocated to each frame of the downlink channel, with the frame control message slot, slot allocation information of the uplink channel, slot allocation information of the downlink channel, response information against data transmitted through the uplink channel, response information against a connection setup—connection release request from the mobile station, and response information against a registration—deregistration request from the mobile station being transmitted from the base station to the mobile station, the uplink channel containing a message data slot (MDS) and an activation slot (ACTS), the activation slot being composed of a plurality of mini slots each of which has a length of one frame or smaller, with the activation slot, the connection setup—connection release request and the registration—deregistration request received from the mobile station being transmitted from the mobile station to the base station, with the message data slot, response information against downlink data being transmitted to the base station, the base station comprises:

a transmission buffer that temporarily stores data to be transmitted to the mobile station through the downlink channel; and a control data forming portion that forms the frame control message slot, wherein when the control data forming portion sets up allocation information of the uplink channel including the number of activation slots of each frame of the uplink channel, if the use rate of the transmission buffer is larger than a predetermined value, the number of activation slots contained in each frame of the uplink channel is set to zero, if the use rate of the transmission buffer is not larger than the predetermined value, a collision probability is obtained according to detected collisions contained in the response information against the downlink data, if the collision probability is smaller than a predetermined value, the number of activation slots contained in each frame of the uplink channel is set to 1, and if the collision probability is larger than the predetermined value, the number of activation slots is increased to 2 or higher value.

* * * * *